United States Patent
DeMeo et al.

(10) Patent No.: US 7,476,889 B2
(45) Date of Patent: Jan. 13, 2009

(54) RADIATION DETECTABLE AND PROTECTIVE ARTICLES

(75) Inventors: Ronald DeMeo, Miami Beach, FL (US); Joseph Kucherovsky, Philadelphia, PA (US); Amit Kurupathi, Miami, FL (US)

(73) Assignee: Meridian Research and Development, Ft. Lauderdale, FL (US)

( * ) Notice: Subject to any disclaimer, the term of this patent is extended or adjusted under 35 U.S.C. 154(b) by 200 days.

(21) Appl. No.: 11/019,952

(22) Filed: Dec. 20, 2004

(65) Prior Publication Data

US 2005/0211930 A1 Sep. 29, 2005

Related U.S. Application Data

(63) Continuation-in-part of application No. 10/620,954, filed on Jul. 16, 2003, now Pat. No. 6,841,791, which is a continuation-in-part of application No. 10/238,160, filed on Sep. 9, 2002, now Pat. No. 6,828,578, which is a continuation-in-part of application No. 09/940,681, filed on Aug. 27, 2001, now Pat. No. 6,459,091, which is a continuation-in-part of application No. 09/206,671, filed on Dec. 7, 1998, now Pat. No. 6,281,515.

(51) Int. Cl.
  *G21F 3/02* (2006.01)
(52) U.S. Cl. .................. 250/516.1; 250/519.1
(58) Field of Classification Search .............. 250/516.1, 250/519.1; 430/350, 353, 14, 619, 510
See application file for complete search history.

(56) References Cited

U.S. PATENT DOCUMENTS 1,800,051 A    4/1931  Blanco (Continued)

FOREIGN PATENT DOCUMENTS

SU    1424847 A1    11/1986

(Continued)

OTHER PUBLICATIONS

Dadachova, Ekaterina, et al., Ionizing Radiation Changes the Electronic Properties of Melanin and Enhances the Growth of Melanized Fungi, *PLoS One 2007*, Issue 5, e457, pp. 1-13.

(Continued)

*Primary Examiner*—Nikita Wells
*Assistant Examiner*—Johnnie L Smith, II
(74) *Attorney, Agent, or Firm*—Townsend and Townsend and Crew LLP; Guy W. Chambers

(57) ABSTRACT

Compositions and processes for forming radiopaque polymeric articles are disclosed. In one embodiment, radiation inspection apparatuses and methods are then used to determine the presence and attributes of such radiopaque polymeric articles. A radiopaque polymeric article of the present invention can be created by mixing a radiopaque material, such as barium, bismuth, tungsten or their compounds, with a powdered polymer, pelletized polymer or liquid solution, emulsion or suspension of a polymer in solvent or water. In addition to creating radiation detectable objects, the radiopaque polymeric materials of the present invention can be used to create radiation protective articles, such as radiation protective garments and bomb containment vessels. Enhanced radiation protection can also be achieved through the use of nano-materials. The principals of the present invention can be used to provide protection against other types of hazards, including fire, chemical, biological and projectile hazards.

20 Claims, 8 Drawing Sheets

U.S. PATENT DOCUMENTS

| | | | |
|---|---|---|---|
| 3,030,628 A | 4/1962 | Crosson | |
| 3,045,121 A | 7/1962 | Leguillon | |
| 3,052,799 A | 9/1962 | Hollands | |
| 3,164,840 A | 1/1965 | Reynolds | |
| 3,569,713 A | 3/1971 | Via, Jr. | |
| 3,883,749 A | 5/1975 | Whittaker et al. | |
| 3,974,104 A | 8/1976 | Foster et al. | |
| 4,103,176 A | 7/1978 | Coyle | |
| 4,129,524 A | 12/1978 | Nagai et al. | |
| 4,429,094 A | 1/1984 | Massucco | |
| 4,589,408 A | 5/1986 | Singer | |
| 4,740,526 A | 4/1988 | Yamamoto | |
| 4,882,392 A | 11/1989 | Smid et al. | |
| 4,891,399 A | 1/1990 | Ohkawa et al. | |
| 4,913,978 A | 4/1990 | Klotz et al. | |
| 4,938,233 A | 7/1990 | Orrison, Jr. | |
| 4,989,266 A | 2/1991 | Borgese et al. | |
| 5,001,354 A | 3/1991 | Gould et al. | |
| 5,016,292 A | 5/1991 | Rademacher | |
| 5,038,047 A | 8/1991 | Still | |
| 5,059,807 A | 10/1991 | Kersten et al. | |
| 5,140,710 A | 8/1992 | Rademacher | |
| 5,148,040 A | 9/1992 | Wise et al. | |
| 5,149,203 A | 9/1992 | Sacks | |
| 5,220,175 A | 6/1993 | Cole | |
| 5,245,195 A | 9/1993 | Shah et al. | |
| 5,331,683 A | 7/1994 | Stone et al. | |
| 5,446,925 A | 9/1995 | Baker et al. | |
| 5,453,314 A | 9/1995 | Collier et al. | |
| 5,506,059 A | 4/1996 | Robbins | |
| 5,523,581 A | 6/1996 | Cadwalader et al. | |
| 5,525,408 A | 6/1996 | Weir et al. | |
| 5,548,125 A | 8/1996 | Sandbank | |
| 5,637,113 A | 6/1997 | Tartaglia et al. | |
| 5,814,824 A | 9/1998 | Hamby et al. | |
| 5,856,415 A | 1/1999 | Lagace et al. | |
| 6,153,666 A | 11/2000 | Lagace | |
| 6,281,515 B1 | 8/2001 | Demeo et al. | |
| 6,376,590 B2 * | 4/2002 | Kolb et al. | 524/413 |
| 6,382,526 B1 * | 5/2002 | Reneker et al. | 239/294 |
| 6,387,981 B1 * | 5/2002 | Zhang et al. | 523/117 |
| 6,447,439 B1 | 9/2002 | Vallana et al. | |
| 6,459,091 B1 | 10/2002 | DeMeo et al. | |
| 6,520,425 B1 * | 2/2003 | Reneker | 239/294 |
| 6,548,570 B1 | 4/2003 | Lange | |
| 6,572,693 B1 * | 6/2003 | Wu et al. | 106/35 |
| 6,599,448 B1 | 7/2003 | Ehrhard et al. | |
| 6,656,506 B1 * | 12/2003 | Wu et al. | 424/489 |
| 6,665,877 B1 | 12/2003 | Gray | |
| 6,674,087 B2 | 1/2004 | Cadwalader et al. | |
| 6,695,992 B2 * | 2/2004 | Reneker | 264/29.1 |
| 6,740,142 B2 * | 5/2004 | Buettner et al. | 95/273 |
| 6,805,815 B1 | 10/2004 | Soundararajan | |
| 6,828,578 B2 | 12/2004 | DeMeo et al. | |
| 7,201,945 B2 * | 4/2007 | Hirata et al. | 427/372.2 |
| 7,235,295 B2 * | 6/2007 | Laurencin et al. | 428/364 |
| 2002/0160199 A1 * | 10/2002 | Hofacker et al. | 428/412 |
| 2003/0099798 A1 * | 5/2003 | George et al. | 428/36.9 |
| 2004/0013819 A1 * | 1/2004 | Hou et al. | 427/580 |
| 2004/0052859 A1 * | 3/2004 | Wu et al. | 424/490 |
| 2004/0098023 A1 * | 5/2004 | Lee et al. | 606/200 |
| 2004/0180986 A1 * | 9/2004 | Bellare et al. | 523/115 |
| 2005/0272856 A1 * | 12/2005 | Cooper et al. | 524/496 |
| 2006/0057377 A1 * | 3/2006 | Harrison et al. | 428/364 |

FOREIGN PATENT DOCUMENTS

WO  WO2006/124056 A2  11/2006

OTHER PUBLICATIONS

International Search Report, dated Jul. 15, 2008—Int'l Appln. No. PCT/US05/45968 (1 sheet).

* cited by examiner

RADIATION DETECTABLE AND PROTECTIVE ARTICLES

CROSS-REFERENCES TO RELATED APPLICATIONS

This application is a continuation-in-part of pending application Ser. No. 10/620,954, filed Jul. 16, 2003, entitled "Multiple Hazard Protection Articles And Methods For Making Them," which is a continuation-in-part of application Ser. No. 10/238,160, filed Sep. 9, 2002, entitled "Lightweight Radiation Protective Articles And Methods For Making Them," and issued as U.S. Pat. No. 6,828,578 B2 on Dec. 7, 2004, which is itself a continuation-in-part of application Ser. No. 09/940,681, filed Aug. 27, 2001, entitled "Lightweight Radiation Protective Garments," and issued as U.S. Pat. No. 6,459,091 B1 on Oct. 1, 2002, which was a continuation-in-part of application Ser. No. 09/206,671, filed Dec. 7, 1998, entitled "Lightweight Radiation Protective Garments," and issued as U.S. Pat. No. 6,281,515 on Aug. 28, 2001. The disclosures in each of these priority applications are hereby incorporated by reference.

FIELD OF THE INVENTION

The present invention relates to radiation detectable and protective articles. The radiation detectable articles of the present invention can be easily detected through the use of x-rays and other radioactive emissions. The processes and compositions for producing such radiation detectable articles can also be applied to creating articles which protect against radiation as well as other types of hazards, such as fire, chemical, biological and projectile hazards.

BACKGROUND OF THE INVENTION

Radiation has been used by humans in numerous ways. The most well known destructive application of radiation is atomic bombs. The electromagnetic radiation released by an atomic bomb can penetrate deeply into human tissue to damage human cells. The threat posed by atomic bombs has arguably increased in recent years with the growth of terrorism and the very real possibility that a "dirty bomb" can be made by terrorists through use of readily available nuclear waste materials. The destructive threat to humanity of such nuclear bombs has given rise to a need for cost-effective radiation protection, including the need for lightweight radiation protective garments. Ideally, such lightweight radiation protective garments would simultaneously provide protection against other types of hazards, such as fire, chemical, biological, projectile hazards and other forms of electromagnetic radiation. In this way, first responders, such as firemen, paramedics, policemen or the military, could use a single garment to provide them with protection against any type of hazard they might foreseeably confront. Such "universal" protective garments are addressed in Applicants' co-pending application Ser. No. 10/620,954, filed Jul. 16, 2003, entitled "Multiple Hazard Protection Articles And Methods For Making Them", the disclosure of which is incorporated by reference.

A number of constructive uses have also been developed for harnessing radiation. These constructive uses include medical x-rays and nuclear power plants. Other constructive uses of radiation, though, remain undiscovered. For example, in many industries, automated, high-speed machines are used to manufacture products quickly and inexpensively. The food industry is one such industry. For example, machines largely do the manufacture and packaging of the many popular brands of breakfast cereals. To market this mass-produced breakfast cereal, the breakfast cereal manufacturers often include a prize or "premium" inside the cereal box, such as a model of a popular superhero. This premium is typically inserted and sealed into the box by machine during the packaging process.

Where high speed, automated manufacturing processes are used, there is a need for quality control procedures. Returning to the cereal box example, if the cereal box assembly machine runs out of premiums or has its premium insertion apparatus jammed, a number of cereal boxes might be sealed, shipped and sold without the premium. Since, for children's cereals, the cereal box is often purchased for the primary purpose of receiving the premium inside, the manufacturer's failure to include the premium in the cereal box can lead to angry and disillusioned customers.

As such, there is a need, particularly in the high speed manufacturing art, to be able to quickly check to see if the manufactured product is made in full compliance with the company's manufacturing standards (e.g., including any premium) and that the product is also free of foreign contaminants. In the case of cereal boxes, this includes making sure that all of the cereal boxes which are supposed to have premiums actually have them and lack foreign contaminants, such as stones and metals, which can inadvertently enter the final assembly.

While visual inspection by humans is often performed to maintain quality control, visual inspection is difficult to effectively perform for products manufactured on a high-speed assembly line. One problem with visual inspection is giving the human inspector enough time to perform a proper inspection without slowing down the manufacturing process. In the case of trying to detect premiums in cereal boxes, this problem is compounded by the fact that the cereal box is visually opaque and, as such, not amenable to visual inspection of items, such as premiums, which are inside the cereal box.

BRIEF SUMMARY OF THE INVENTION

The present invention includes compositions and processes for forming radiopaque polymeric articles. When these radiopaque polymeric articles are used in high speed, automated manufacturing processes, their attributes and presence can be easily confirmed through the use of radiation inspection apparatuses.

A radiopaque polymeric article of the present invention can be created by mixing a radiopaque material, such as barium, bismuth, tungsten or their compounds, with a powdered polymer, palletized polymer or liquid solution, emulsion or suspension of a polymer in solvent or water. The polymer may advantageously be selected from a broad range of plastics including, but not limited to, polyurethane, polyamide, polyvinyl chloride, polyvinyl alcohol, natural latex, polyethylene, polypropylene, ethylene vinyl acetate, polyester, acrylonitrile-butadiene-styrene, acrylic, polycarbonate, polyoxymethylene, acetal, polytetrafluoroethylene (TEFLON™), ionomers, celluloses, polyetherketones, silicones, epoxy, elastomers, polymer foams and other polymer compounds.

The radiopaque polymeric mixture can then be used to form a radiopaque polymeric article through a number of existing commercial processes, such as injection molding, extrusion and thermoforming. For example, in the case of injection molding, the radiopaque polymeric mixture can be heated in an extruder and then injected into a mold until it assumes the shape of the mold. After the radiopaque polymeric mixture has hardened into the appropriate molded shape, it is removed from the mold. In the case of a superhero model, the molded model can then be wrapped in cellophane and inserted, as a premium, into a cereal box.

The radiopaque article may also be advantageously formed by spraying, adhering or coating a radiopaque adhesive mixture onto a pre-existing article. For example, mixing a lightweight radiopaque material with an adhesive, such as a gum adhesive or a liquid polymer, can form the radiopaque adhesive mixture. The radiopaque adhesive mixture may then be applied to the pre-existing article either by spraying the radiopaque adhesive mixture onto the article or dipping the article in the radiopaque adhesive mixture.

During the manufacturing process, a radiation inspection apparatus can be used to detect the presence and attributes of a radiopaque polymeric article. In one embodiment, x-rays are passed through the radiopaque polymeric article itself or a radiation transmissible package containing the radiopaque polymeric article. An x-ray detector is then positioned on the opposite side of the radiopaque polymeric article to detect where the radiation has been attenuated and where it has been transmitted. Through this x-ray detector, the presence of the radiopaque polymeric article can be confirmed and, if desired, the attributes of the radiopaque polymeric article (e.g., proper dimensions, quantity, lack of defects etc.) can be ascertained. This x-ray detector can also make sure that undesired foreign contaminants, such as stones or metal debris, are not included in the finished product.

A number of the processes and compositions used for creating radiopaque detectable objects may also be used to provide protection against a wide spectrum of ionizing radiation, such as neutron, ultraviolet, gamma and radio frequency radiation. For example, in the inventor's co-pending priority application Ser. No. 10/620,954, the disclosure of which is incorporated by reference, the radiopaque polymeric compounds of the present invention are used to create radiation protective garments, which, in some cases, can also provide protection against other hazards (e.g., fire, chemical, biological, projectile etc.). Similarly, in the same way an adhesive mixture of radiation protective materials can be sprayed onto a pre-existing object to make it radiation detectable, the same type of mixture can be sprayed onto a garment to make it attenuate radiation.

As another part of the present invention, recent advances in nanotechnology can be used to create better radiation detectable and radiation attenuating articles. In certain embodiments, these radiation attenuating articles can also provide protection against other types of hazards, such as fire, chemical, biological, projectile hazards, and a wide range of electromagnetic radiation energies. Owing to their small size and high surface area to volume ratio, these nano-materials have demonstrated unique electrical, mechanical and optical properties. In this invention, various types of nano-materials can be utilized to enhance mechanical, thermal, attenuating and barrier protection properties of a product.

In the present invention, nano-materials are used in at least three different ways. In one embodiment, nano-materials are added to the previously disclosed radiation protective polymeric mixtures to either enhance the radiation protection or provide additional protections, such as fire, chemical, biological and/or projectile protection. In a second embodiment, nanoparticles formed from radiopaque materials (e.g., barium, bismuth, tungsten etc.) are used in the radiation protective mixture instead of more bulky forms of the same or similar radiopaque materials. Use of such radiopaque nano-materials allows more even dispersion of radiopaque materials in the polymeric mixture, with the attendant possibility of allowing higher concentrations of radiopaque materials before the polymer becomes embrittled. In a third embodiment, the nano-materials are formed into a discrete nano-material layer. Such a discrete nano-material layer could either be added to a product or formed into a stand alone product.

Nano-materials for use in the present invention include nanoparticles, nanotubes and nano-platelets. Nanoparticles are predominantly formed as solid grains, but may also consist of hollow nanospheres, nano shells, hemi-spheres, parabolas and so forth. Nanoparticles can be formed of various metal/non-metal powders including oxides, sulphides and ceramic powders. Nano-platelets are layered nano-materials which include natural nanoclays and synthetic nanoclays, such as silicic acids and transition-metal dichalcogenides (i.e. tantalum dichalcogenides interacted with lithium). Nanotubes are tube like nano-materials that have a diameter of a few nanometers but yet could be several microns in length.

To attenuate electromagnetic radiation such as radio waves, ultra-violet rays and ionizing radiation, nano-particles can be formed of conventional radiopaque materials such as tungsten, tantalum, barium or their compounds, shell structures such as metal coated magnetic particles like $Fe_2O_3$/Au, $SiO_2$/Au or other coated semiconducting particles like PbS/CdS. Hollow metal, metal oxide/sulphides nanospheres or nanospheres of other compounds; nanoparticles having shapes of parabolas, hemi-spheres and shell structures can also be used in this current invention. Shaped nanoparticles (e.g., nanoparabolas, nano hemi-spheres, nanospheres etc.) are believed to deflect, reflect and capture radiation in a manner similar to the way mirrors deflect, reflect and capture lightwaves. Since these shaped nanoparticles are believed to attenuate radiation differently than powdered radiopaque nanoparticles, these shaped nanoparticles do not need to be formed from radiopaque materials, but may instead be formed from such materials as metal/semiconductor hybrid particles. For example, the hybrid CdS-coated Ag nanoparticles exhibit red-shifted plasmon resonance absorption. This resonance absorption band of the metal nanoparticles is a function of particle size. As the particle size decreases, the theoretical wavelength of maximum absorption intensity can be approached. By creating these nano-spheres, nano-hemi-spheres, and nano-parabolic structures in specific shapes and curvatures, the optical properties can be used against smaller wavelengths of the light spectrum to attenuate electromagnetic radiation in the radiowaves, ultraviolet rays and ionizing radiation frequencies. Rather than absorbing the electromagnetic radiation as in the case of heavy metals, the electromagnetic radiation is effectively redirected, shifted, or reflected to allow its energy to be reduced to a lower level or converted to heat.

To enhance the chemical and fire-retardant properties of a polymeric mixture, nano-materials of suitable composition can be evenly dispersed in the polymeric mixture. For instance, nanoclays when properly dispersed in a polymer enhances its chemical properties by creating a tortuous path in the polymer matrix, which makes hard for the harmful chemicals, biological agents and other gases, such as oxygen, to penetrate the polymer. To increase the fire-retardant properties of the polymer, a small percentage of nanoclays or other nano platelets in the range of 2 to 10% could be added along with conventional fire retardants, such as alumina trihydrate, magnesium hydroxide or other organic brominated and organic chlorinated compounds either in the nanoscale or micron range. Nanotubes can be used to enhance the mechanical properties such as tensile strength, flexibility, modulus and electrical conductivity of a polymeric mixture.

There are three general ways of dispersing nano-materials into the polymeric mixture. The first is direct mixing of the polymer and the nano-materials either as a discrete phase or in solution. The second is in-situ polymerization in the presence of a nano material, and the third is in-situ particle processing which involves both in-situ formation of the nano-materials and in-situ polymerization. Also, nanomaterials could be coated on a number of substrates by several techniques such as evaporation, sputtering (glow-discharge, ion-beam, laser), ion-plating, chemical vapor deposition (CVD), plasma enhanced CVD, thermal spraying, dip coating, fluidized bed and atomized liquid spray.

It should also be noted that nano-materials tend to agglomerate to reduce their surface area and, therefore, without proper dispersion and distribution in the polymer matrix the desired properties of the resulting nano-composite cannot be achieved. In order to disperse nano-materials into a polymer and process the resulting mixture by standard manufacturing techniques, they should preferably be surface modified. For instance, in the case of nanoclays, the clay surface is modified by a process known as compatibilization so that they are attracted to the resin matrices and thus get thoroughly dispersed. The two most common compatibilization methods known are onium ion modification and the ion-dipole interaction.

By incorporating nano-materials into polymeric mixtures of the present invention or creating a pure nanolayer, a radiation protective shield can be created to either make an article radiation detectable, radiation protective (ultraviolet, radiofrequency, electromagnetic, x-radiation, or gamma radiation) or "universally" protective (i.e., protective against one or more hazards such as neutron radiation, fire, chemical, biological, or projectile hazards). The resultant radiopaque polymeric mixture, with or without the nano-materials, can additionally be laminated to a chemical film, anti-ballistics fabric, woven or non-woven, or flame retardant material as described in our previously referenced patent applications.

DETAILED DESCRIPTION OF THE INVENTION

Figure 1:
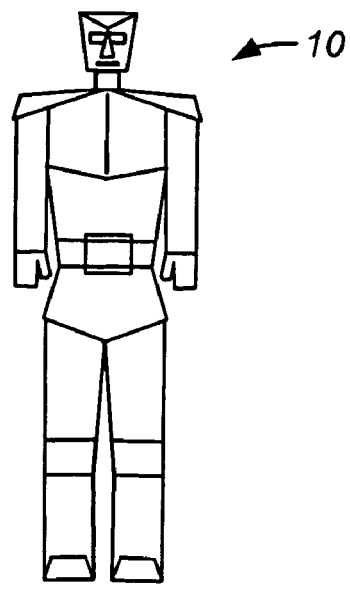
FIG. 1 shows a front view of a radiopaque polymeric article of the present invention.

Referring now to FIG. 1, an example of a radiopaque polymeric article 10 of the present invention is shown. In this case, the radiopaque polymeric article 10 is a premium which can be inserted into cereal boxes taking the form of a plastic toy model. The radiopaque polymeric article 10 is preferably formed from a polymeric mixture, which includes one or more radiopaque materials and one or more polymers. The inclusion of one or more radiopaque materials is important for this polymeric mixture because polymers themselves are largely transparent to many forms of radiation, such as x-rays, and, as such, using a polymer alone will not produce an effective radiopaque polymeric article.

For the radiopaque materials, barium sulfate, tungsten and bismuth are preferred choices for the present invention because, as compared with lead, for example, they have fewer known heath hazards. Other radiopaque materials can also be used, including, but not limited to, barium, other barium compounds (e.g., barium chloride), tungsten compounds (e.g., tungsten carbide and tungsten oxide), bismuth compounds, tantalum, tantalum compounds, tin, titanium, titanium compounds, Diatrizoate Meglumine Inj. USP (sold by Nycomed Corporation under the trade name HYPAQUE™), Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Iopydol, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium. These radiopaque materials can be purchased from a variety of chemical supply companies, such as Fisher Scientific, P.O. Box 4829, Norcross, Ga. 30091 (Telephone: 1-800-766-7000), Aldrich Chemical Company, P.O. Box 2060, Milwaukee, Wis. (Telephone: 1-800-558-9160) and Sigma, P.O. Box 14508, St. Louis, Mo. 63178 (Telephone: 1-800-325-3010). Those of skill in the art will readily recognize that other radiopaque materials incorporating the same metals can be used interchangeably with the ones listed.

The polymer used in the polymeric mixture of the present invention may preferably be selected from a broad range of plastics including, but not limited to, polyurethane, polyamide, polyvinyl chloride, polyvinyl alcohol, natural latex, polyethylene, polypropylene, ethylene vinyl acetate, polyester, polyisoprene, polystyrene, polysulfone, acrylonitrile-butadiene-styrene, acrylic, polycarbonate, polyoxymethylene, acetal, polytetrafluoroethylene (TEFLON™), ionomers, celluloses, polyetherketone, silicones, epoxy, elastomers, polymer foams and other polymer compounds.

Conventional additives may be included in the polymeric mixture to improve the flexibility, strength, durability or other properties of the end product and/or to help insure that the polymeric mixture has an appropriate uniformity and consistency. These additives might be, in appropriate cases, plasticizers (e.g., epoxy soybean oil, ethylene glycol, propylene glycol, etc.), emulsifiers, surfactants, suspension agents, leveling agents, drying promoters, adhesives, flow enhancers, and flame retardants.

The proportions of these various polymeric mixture ingredients can vary. Using a greater proportion of conventional sized radiopaque materials will generally allow the presence and attributes of the radiopaque polymeric article to be more easily ascertained through radiation detection techniques. Nonetheless, if the proportion of conventional sized radiopaque materials compared to the polymer is too high, the polymeric mixture will become brittle when dried or cooled and easily crumble apart. The inventors have found from their work that over 50% of the polymeric mixture, by weight, can be barium sulfate, tungsten, bismuth or other conventional sized radiation protective materials, with most of the rest of the mixture consisting of the polymer.

In one preferred embodiment, the polymeric mixture contains approximately 85% by weight of conventional sized radiopaque materials and approximately 15% by weight of polymer. In this preferred embodiment, the radiopaque materials used in the polymeric mixture are tungsten (75%), barium sulfate (20%) and bismuth (5%). The currently preferred polymers for this preferred embodiment are a mixture of ethyl vinyl acetate (EVA) and polyethylene.

It may be appropriate to consider the use of lead as one of the radiopaque materials for the polymeric mixture. While, because of its potential health hazards, lead would not be as preferred as many of the other radiopaque materials previously listed, lead nonetheless might have a role in some radiopaque polymeric mixtures.

Figure 2:
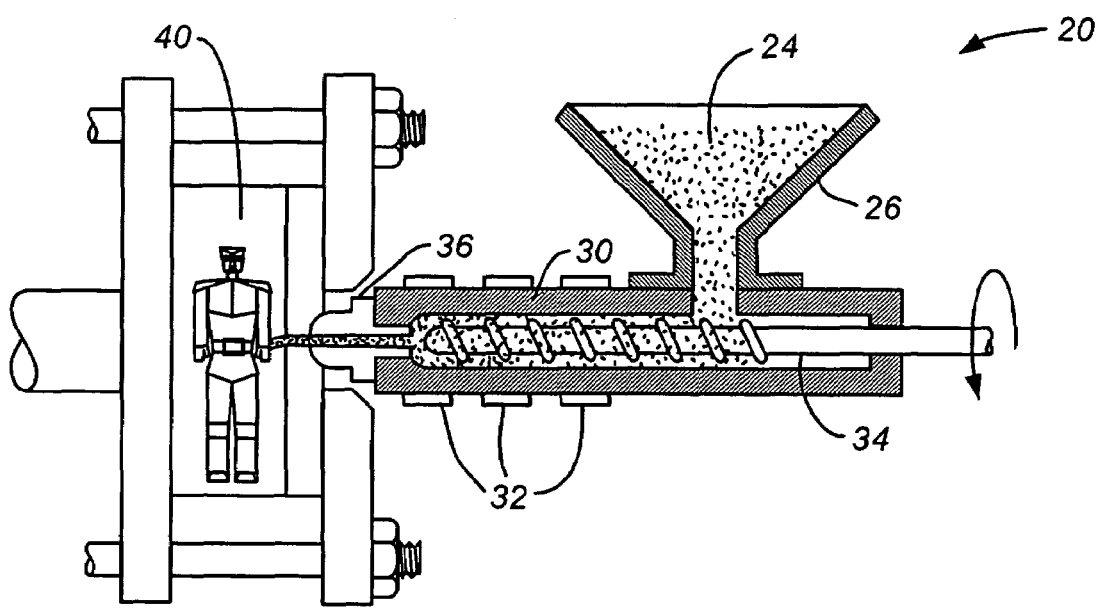
FIG. 2 shows a side view of an injection molding apparatus for creating radiopaque polymeric articles of the present invention.

A number of known manufacturing processes may advantageously be used to create the radiopaque polymeric articles of the present invention. For example, the radiopaque polymeric mixture of the present invention can first be melted in an extruder and then pushed by a piston in molten form into the mold of an injection-molding machine. FIG. 2 illustrates such an injection-molding machine 20. In the FIG. 2 embodiment, the radiopaque polymeric mixture 24 is inserted into a hopper 26. The hopper 26 then feeds the radiopaque polymeric mixture 24 into an extruder 30, which, through use of extrusion heaters 32, melts the polymeric mixture 24 into dough like consistency. The extrusion screw 34 moves the melted polymeric mixture toward the mold 40. As the melted polymeric mixture leaves the extruder 30, it is injected under pressure through extruder nozzle 36 into mold 40. When the polymeric mixture has cooled inside the mold 40, it can be popped out of the mold 40 in finished form. A further example of an injection molding apparatus and process is described in Walter's U.S. Pat. No. 6,572,801 B1, the disclosure of which is hereby incorporated by reference.

Thermoplastics, thermosets and elastomers can all be injection molded. By using multiple inlets to the mold 40 (not shown), a co-injection molding process allows molding of components with different materials, colors and/or features. Moreover, other types of molding techniques can be used depending on the shape, thickness, weight range, allowable tolerance, surface roughness and economic batch size of the injection-molded articles. These other types of molding techniques include, but are not limited to, rotational molding for large hollow closed or semi-closed structures, blow molding, foam molding, compression molding, resin transfer molding, die-casting, sand casting, investment casting, polymer casting, shape rolling, die forging, extrusion, press forming, roll forming, spinning, thermoforming, lay-up methods, powder methods, laser prototyping and deposition.

Many other known plastic forming techniques can be used to form the radiopaque polymeric articles of the present invention. For example, the polymeric mixture of the present invention could again be put into the hopper of an extruder, heated and, in this case, deposited in molten form as a thin film on a conveyor belt. Vacuum pressure could then be applied to the thin film so as to draw the molten film into intimate contact with a mold impression to form the thin film into its desired shape. An example of such vacuum forming techniques is described in greater detail in Gilbert's U.S. Pat. No. 6,319,456 B1, the disclosure of which is hereby incorporated by reference. Alternatively, instead of drawing the thin film into a vacuum mold, the thin film sheet could simply be cut into a desired planar shape.

As a further alternative, the article, such as the superhero, could be pre-formed and subsequently made radiopaque through the application of a thin radiopaque layer. In such case, mixing a lightweight radiopaque material with an adhesive, such as a gum adhesive or a liquid polymer, could advantageously form the radiopaque layer. The radiopaque adhesive mixture could then be applied to the pre-formed article either by spraying the radiopaque adhesive mixture onto the outside of the article or dipping the article in a solution of the radiopaque adhesive mixture.

The mold used in the injection molding process shown in FIG. 2 might, for example, be in the shape of the superhero model 10 illustrated in FIG. 1. In addition to premiums, injection molding is used today to produce many other types of plastic articles, which could benefit from becoming radiopaque polymeric articles of the present invention. For example, a plastic straw is often attached to children's juice cartons in order to allow the child to drink the juice without spilling. Similarly, a plastic utensil, such as a spoon or fork, might be attached to a serving of food embedded in a plastic container. If the straw or other utensil is missing from the food container, the user will either have to throw the product away or manually try to eat from the container, thereby dealing with an attendant mess. If the straw or other utensil in this example were made of a radiopaque polymer of the present invention, a radiation inspection apparatus could be used to make sure that all the containers leaving the assembly line have radiopaque straws or other utensils attached.

Since the straw or other utensil in this example touches the mouth of the user, it would be important to choose a non-toxic radiopaque material for the polymeric mixture, such as barium sulfate, iodine, bismuth or some combination of them or their compounds, rather than a toxic material, such as lead. A further factor to be considered in selecting a suitable radiopaque material is the degree of radiation attenuation which the material would provide. For example, in the straw and juice box example, the cardboard juice box freely transmits radiation. As such, one would not need a radiopaque compound with strong attenuating properties to create a sufficient radiation contrast between the straw and the box. More specifically, a radiopaque compound with relatively weaker attenuation properties, such as iodine compounds, could be used for the straw and juice box example or a radiopaque compound with stronger attenuation properties, such as a bismuth compound, could be used in lower concentrations.

Other packaging industries would also benefit from the principles of the present invention. In disposable medical products, most of the devices are made of plastic and, if any of the contents were missing, the entire device would likely fail. Using radiopaque plastics of the present invention, an x-ray inspection of the sealed medical package at the factory could insure that all the contents of the medical device were present. Also in the field of medicine, a catheter could be manufactured with radiopaque materials using the principles of the present invention, which would allow the catheter's insertion into the human body to be carefully monitored using an x-ray machine. By so monitoring the catheter insertion, the doctor could make sure that the catheter reaches the correct position in the patient's body.

As a further application, guns, knives and explosives are now being produced from plastics, which cannot be detected by the x-ray scanning machines used at airports. If such plastic guns, knives and/or explosives were in the hands of terrorists, they could be used to pose a threat to airplane crews and passengers. Using the principles of the present invention, the government could require that all plastic guns, knives and explosives incorporate one and more radiopaque materials of the present invention so that they would be readily detectable by the x-ray scanning machines used at airports. Given the great importance of detecting guns, knives and explosives at airports, the government would likely want to require that radiopaque compounds with high attenuating properties, such as bismuth compounds, be used for these applications.

Figure 3:
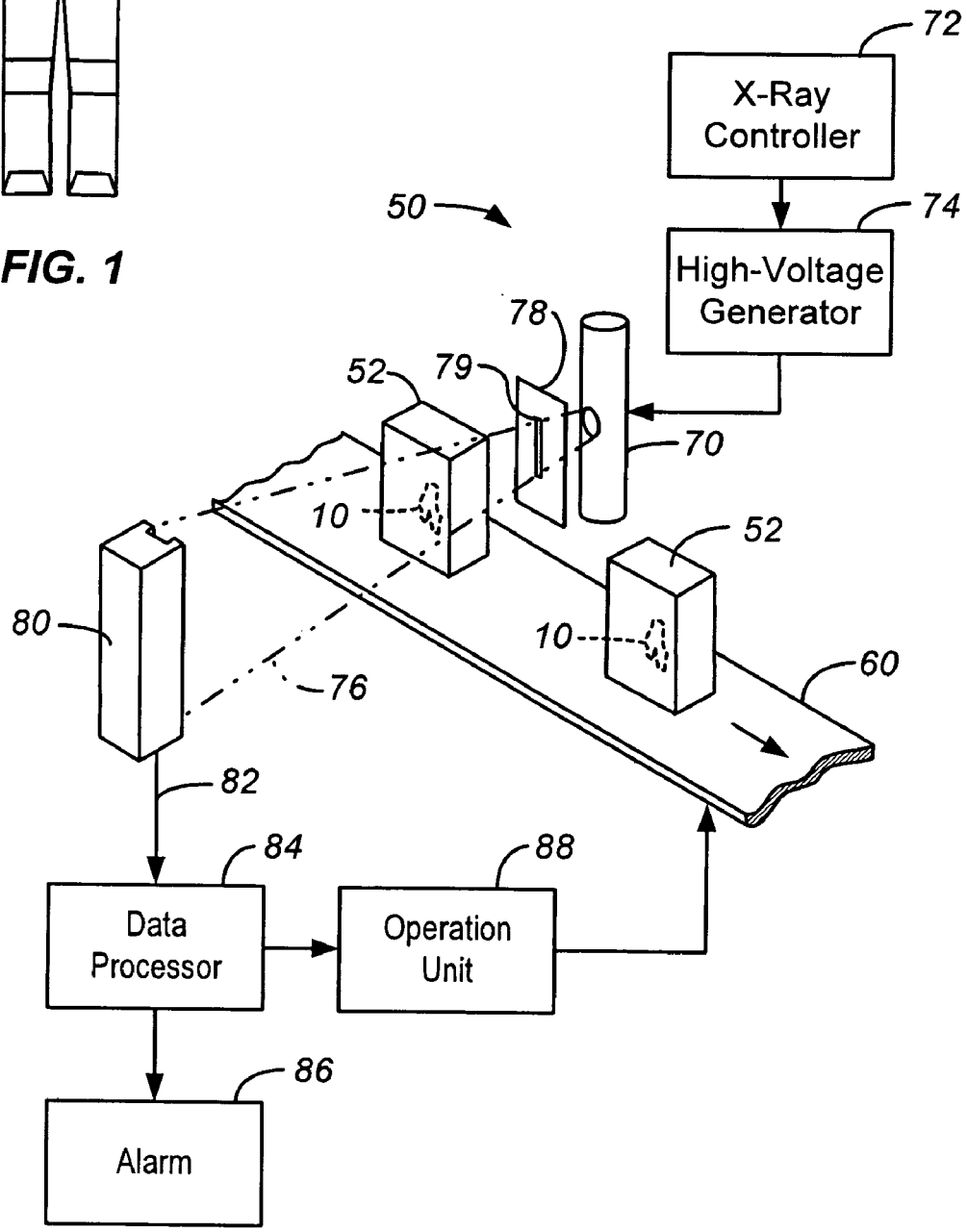
FIG. 3 shows a perspective view of an apparatus for detecting the presence and attributes of a radiopaque polymeric article on a high-speed assembly line.

Referring now to FIG. 3, a radiation inspection apparatus 50 and process is illustrated for detecting radiopaque polymeric articles 10 of the present invention. In the process shown in FIG. 3, boxes or other containers 52 incorporating the radiopaque polymeric articles 10 are moving along a conveyor belt 60 in a high speed manufacturing process. In this preferred embodiment, an x-ray tube 70 is used to generate radiation for detecting the presence or absence of the radiopaque polymeric articles 10 in the box or other container 52. The x-ray tube 70 is controlled by an x-ray controller 72, which sends control signals to a high-voltage generator 74. The high voltage generator 74 applies a high voltage between the anode and the cathode of the x-ray tube 70 to produce x-rays 76. A lead plate 78 with a slit 79 is interposed between the x-ray tube 70 and the box or other container 52. This lead plate 79 serves to focus the x-rays on the box or other container 52 being inspected and prevent extraneous x-rays from harming manufacturing workers.

After the x-rays pass through the box or other container 52 being examined, the x-rays are detected by an x-ray detector 80. The x-ray detector 80 can include a scintillator and one or more MOS image sensor(s). In such an arrangement, incident x-rays are converted by the scintillator into visual light, which is detected by the MOS image sensor(s). The MOS image sensor, in turn, outputs a detection signal 82 whose characteristics correspond to the amount of incident x-ray radiation detected.

A data processor 84 is used to analyze the detection signal 82 received from the x-ray detector 80. Since the box 52 itself would evenly transmit x-ray radiation, a detection signal with no discontinuities would indicate that the radiopaque polymeric article 10 is missing from the box 52. By contrast, since the radiopaque polymeric article 10 would block a portion of the radiation, a detection signal with sharp discontinuities would usually indicate the presence of the radiopaque polymeric article 10 in the box.

Further confirmation that the radiopaque polymeric article 10 is actually in the box 52 can be made by measuring the level or pattern of x-rays detected by the x-ray detector 80. For example, the amount of radiation detected by the x-ray detector 80 for a box 52 having a radiation detectable article 10 can be measured and loaded into the memory of the data processor 84 as a template. The data processor 84 could then compare the level for each subsequent box 52 on the conveyor 60 with the memorized template value and, if the two values match within a pre-determined tolerance, the data processor 84 could conclude that the box 52 indeed contains the radiopaque polymeric article 10. If, by contrast, the data processor 84 concludes that the box 52 is missing the radiopaque polymeric article 10, it could send a signal to alarm 86 to alert an attendant to the defective box 12. Alternatively, the data processor 84 could direct an operation unit 88 to either stop the assembly line or eject the defective box from the assembly line.

For even greater precision of inspection, the x-ray detector 80 could have a pattern of detection pixels which each would detect the transmission of x-ray radiation over a small defined area. To establish a template, a box 52 with a radiopaque polymeric article 10 could be x-rayed with the x-rays being detected by the pattern of pixels. The level of detected x-rays for each pixel would then be stored in the memory of the data processor 84 as a template for future inspections. The data processor 84 could then, for each pixel, compare the level of detected radiation for each box 52 inspected during the manufacturing process with the memorized template to first determine, within a predetermined tolerance, whether the inspected box 52 contains a radiopaque polymeric article 10. The data received from the detailed detection pixels could then be used to determine the shape (e.g., outside contours) of the radiopaque polymeric article. Moreover, use of the detection pixels also allows analysis of whether there is a crack, nick or other defect in the radiopaque polymeric article 10. The use of pixel data in a radiation inspection apparatus to detect the presence of cracks or nicks in an article is described in greater detail in Sawada's U.S. Pat. No. 6,574,303 B2, the disclosure of which is incorporated herein by reference.

In addition to detecting the presence and attributes of a desirable object in a box, the radiation inspection apparatus 50 shown in FIG. 3 could simultaneously, or alternatively, detect unwanted contaminants, such as stones, dirt or metal debris. Since such contaminants are likely to attenuate radiation differently from both the box and the radiopaque polymeric article, the data processor 84 could use a suspicious difference in detected radiation attenuation to either sound alarm 86 or use operation unit 88 to stop the conveyor 60.

Thus far, the focus has been on methods and compositions for forming radiopaque detectable articles. Nonetheless, many of the same principles can be applied to making articles which protect against the harmful effects of radiation, including ultraviolet, electromagnetic, radiofrequency, neutron, x-ray and gamma radiation, as well as other hazards (e.g., fire, chemical, biological, and ballistic). For example, in the inventor's co-pending priority application Ser. No. 10/620,954, the disclosure of which is incorporated by reference, the radiopaque polymeric compounds of the present invention are used to create garments which protects against radiation and other hazards. Similarly, in the same way an adhesive mixture of lightweight radiation protective materials can be sprayed, adhered or coated onto a pre-formed object to make it radiation detectable in the previous examples, the same type of mixture can also be sprayed, adhered or coated onto a garment to make it radiation protective.

Figure 4:
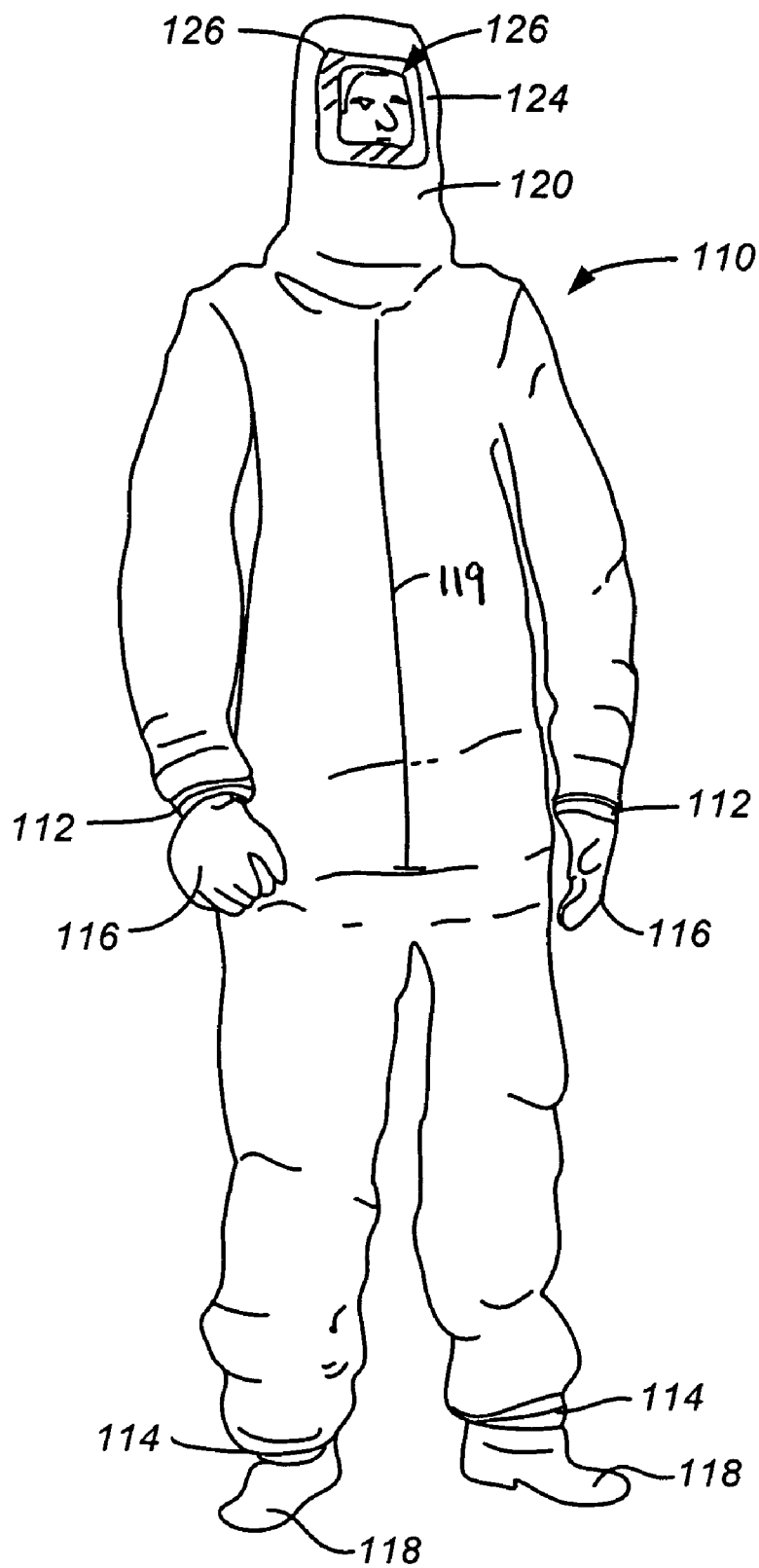
FIG. 4 shows a front view of radiation protective full body suit.

FIG. 4 shows a full body suit 100, which is constructed from radiation protecting polymeric mixtures of the present invention. To provide complete surface protection, the full body suit 100 should preferably be a one-piece jumpsuit, which covers every portion of the human body. Elastic bands 112, 114 can be used around the hand and foot areas to help insure a tight fit. Alternatively, the gloves 116, booties 118 and hood 120 can be separate pieces, which overlap with the rest of the jumpsuit so as to leave no skin surface exposed. The full body suit 110 can also include hook and loop fasteners or a zipper flap 119 to allow the user to easily enter the full body suit 110. A transparent eye shield 124 is preferably included with the full body suit 110 to provide protection for the face. For convenience, the eye shield 124 could be hinged, such as with corner rivets 126, in order to allow the user to flip the shield 124 up and down. Alternatively, the eye protection can be a stand alone device, such as safety glasses (not shown). To provide radiation protection, the eye shield 124 preferably incorporates lead or other radiopaque compounds that are capable of attenuating radiation.

Figure 6:
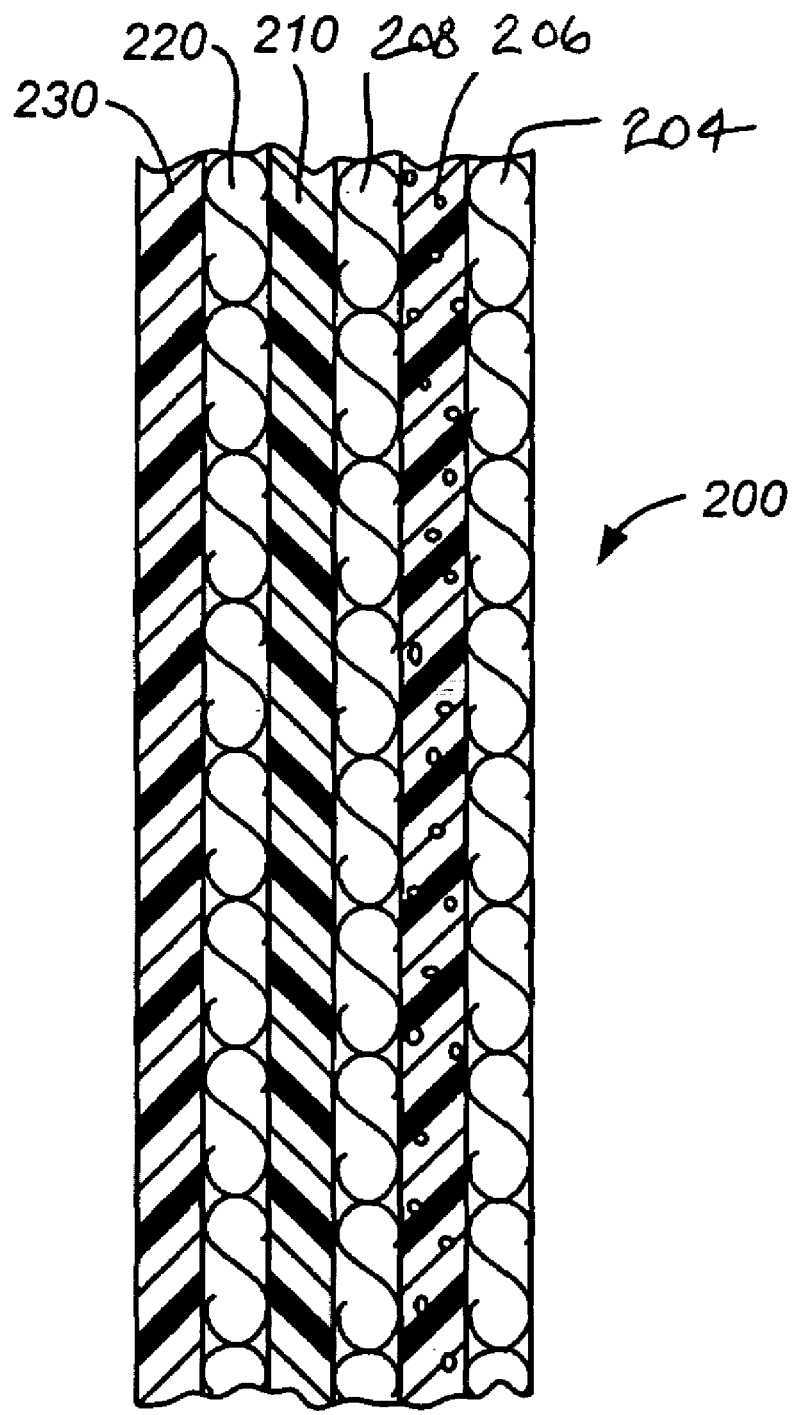
FIG. 6 illustrates a cross-section view of a composite material which can provide multiple forms of hazard protection.

Turning to FIG. 6, a composite material cross-section 200 is illustrated which, when fashioned into an article, can provide protection against numerous life threatening hazards, including toxic chemicals, infectious biological agents, fire and metal projectile hazards, in addition to the hazards posed by radiation. As part of this multiple hazard protection composite material, there can be two layers of fabric 204, 208 with a radiation protective polymer mixture 206 sandwiched between them. Added to these three layers 204, 206, 208 can be additional layers 210, 220, 230 to protect against different hazards. For example, a nonporous chemical protective layer 210 and/or 220 can be added to the three radiation protective layers 204, 206, 208. This nonporous chemical layer can either be a polymer film 210 laminated onto the three radiation protective layers 204, 206, 208 and/or a chemical protective fabric 220 which is sewn or otherwise adhered onto the three radiation protective layers.

This chemical protective layer 210, 220 can be constructed of known chemical protective polymers and/or fabrics. For example, one known class of chemically protective fabrics are non-woven textiles, such as the flashspun polyethylene fabric sold by DuPont under the tradename Tyvek®, polypropylene fabrics such as Kimberly-Clark's Kleenguard™, Kappler's Proshield 1™, Lakeland's Safeguard 76™, fabrics mixing polyethylene with polypropylene and cellulose based fabrics such as DuPont's Sontara™ and Kimberly Clark's Prevail™. A similar type of non-woven textile would be the class of plastic films laminated onto one or both sides of a nonwoven fabric including DuPont's TyChem® series of fabrics, Kimberly Clark's HazardGard I, II™ fabrics, Kappler's CPF™ and Responder series of fabrics and ILC Dover's Ready 1 fabric™. These non-woven textiles would typically be combined with the three radiation protective layers 204, 206, 208 by sewing or otherwise adhering the fabrics together.

Chemical protection can also be imparted by using polyvinyl chloride and/or chlorinated polyethylene films, such as ILC Dover's Chemturion™. These films could be laminated or extruded onto the three radiation protective layers 204, 206, 208.

Another class of chemical protective layers are polymer films with microscopic pores laminated onto fabrics such as Gore-tax® or polypropylene based fabrics such as DuPont's NexGen™, Kimberly Clark's Kleenguard Ultra™, Lakeland's Micro-Max™ and Kappler's Proshield 2™. Chemical protection can further be provided by materials incorporating an absorbent layer, such as the carbon/fabric combinations sold by Blucher GmbH and Lanx. Another class of chemically protective fabrics are woven fabrics coated with rubber or plastic on one or both sides. These coated chemically protective fabrics include polyvinyl chloride and nylon composites, polyurethane/nylon composites, neoprene/aramid composites, butyl/nylon composites, chlorinated polyethylene/nylon composites, polytetrafluoroethylene (i.e., Teflon®/fiberglass composites and chlorobutyl/aramid composites.

Because the chemical protective layers 210, 220 is preferably nonporous, it will also provide protection against infectious biological agents.

While the fabric shown in FIG. 6 can provide a broad measure of protection with only the addition of one or more chemical protective layers 210, 220 to the three radiation protective layers 204, 206, 208, further or alternative layers 210, 220, 230 can nonetheless also be chosen to protect against additional hazards or promote heat dissipation. For example, where the chemically protective layer 210 is a plastic laminate, layer 220 in FIG. 6 could be another woven or nonwoven fabric layer and layer 230 could be a fire protection layer, such as a layer produced from the Nomex® fire resistant aramid fabric manufactured by DuPont. Other types of fire resistant materials include combinations of the Nomex® and Kevlar® aramid fabrics such as that sold by Southern Mills, combinations of melamine resin with aramid fibers, combinations of polytetrafluoroethylene (i.e., Teflon®) with aramid fibers, combinations of rayon with aramid fibers, combinations of polybenzimidazole with aramid fibers, combinations of polyphenylenebenzobisoxazole with aramid fibers, combinations of polyimide with aramid fibers and Mylar™ plastic films. Moreover, traditional fire retardant additives include aluminum trihydrate (ATH), magnesium hydroxide or organic brominated or chlorinated compounds. Alternatively, layer 230 could be a bullet or shrapnel resistant layer produced from bullet stopping aramid and/or polyethylene fibers.

It may alternatively be prudent to form layer 230 of a heat dissipation material. One way of forming such a heat dissipation layer is to mix compounds with high thermal conductivity, such as silver, copper, gold, aluminum, beryllium, calcium, tungsten, magnesium, zinc, iron, nickel, molybdenum, carbon and/or tin, with a polymer in the same way that the radiation protective materials are mixed with polymers to form radiation protective layer 206.

While a six layer hazard protecting fabric 200 is illustrated in FIG. 6, those of skill in the art will readily recognize that a multiple hazard protecting fabric can be created with more or less than six layers. For example, the woven or non-woven fabric layers 204, 208 illustrated in FIG. 6 can be omitted. It is also possible to combine different hazard protecting or heat dissipating layers together into a single layer. For example, while the radiation protective layer 206 of the present invention has been found to provide superior heat dissipating properties on its own, these heat dissipating properties can be enhanced by adding strong thermal conductors, such as silver, copper and/or aluminum, to the mixture of radiopaque materials in the radiation protective layer 206.

Figure 7:
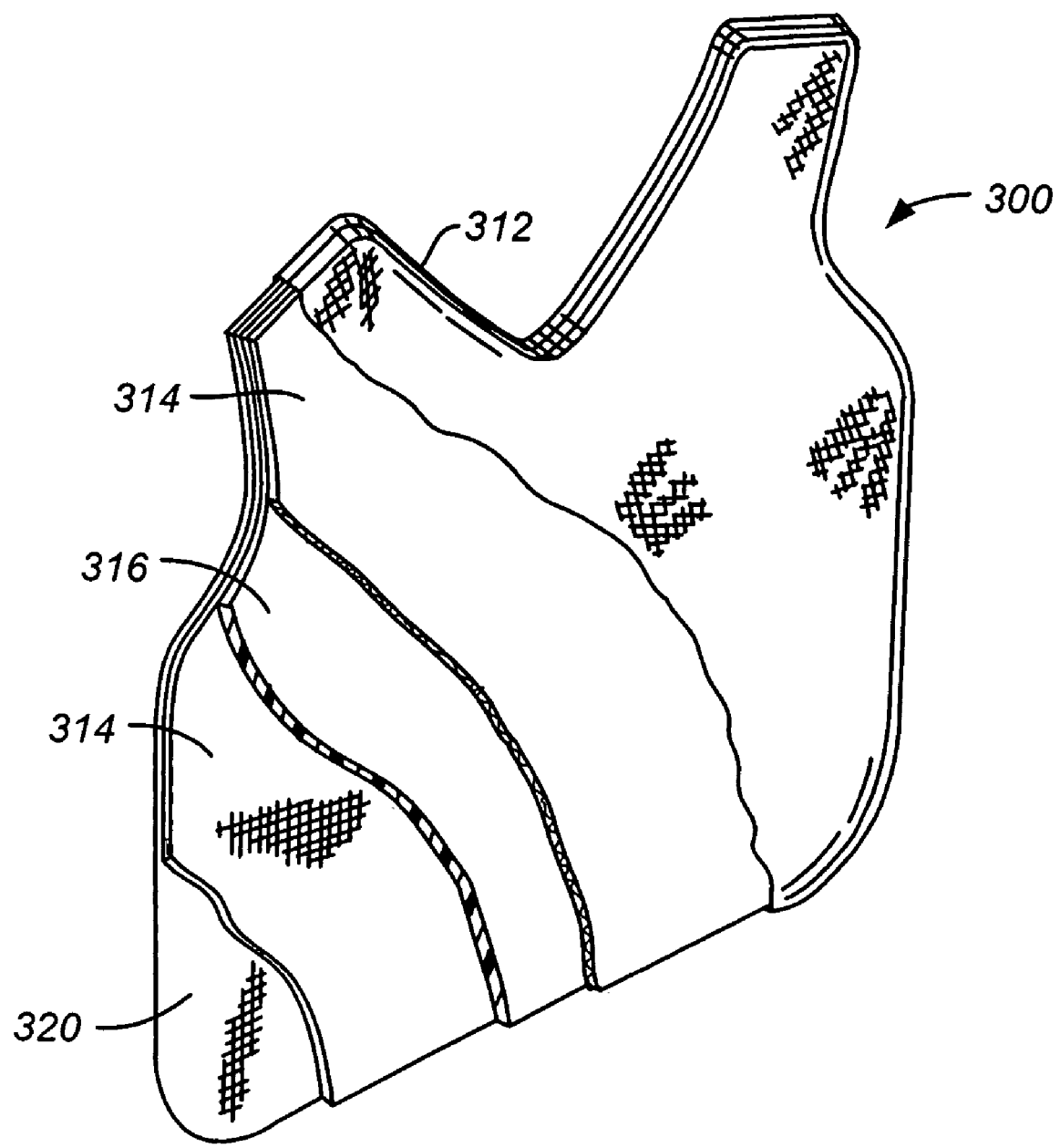
FIG. 7 illustrates a vest formed of multiple hazard protecting layers.

Turning now to FIG. 7, a bullet proof vest 300 is illustrated which has additional hazard protecting properties. Most of the bullet proof vest 300 is of conventional design, similar to that shown in Borgese's U.S. Pat. No. 4,989,266, the disclosure of which is hereby incorporated by reference. The bullet proof protection is primarily provided by layers of polyethylene fibers 314 and/or aramid fibers 316. Commercially available polyethylene fabrics used for bulletproof vests include Honeywell's Spectra™ series of ultra high molecular weight polyethylene fabrics and Honeywell's Spectraguard™ ultra high molecular weight polyethylene fabrics which also include fiberglass. Commercially available aramid fabrics used in bulletproof vests include DuPont's Kevlar® series of aramid fabrics and Akzo's Twaron™ series of aramid fabrics. In this preferred example, the bullet proof vest has one or more layers of aramid fibers 316 sandwiched between layers of polyethylene fibers 314. To obtain greater levels of protection against bullets and shrapnel, one typically creates a greater number of layers of aramid fibers 314 and/or polyethylene fibers 316. Additional strength can be created by laying plies of the bulletproof material at 90 degree orientations to one another and encapsulating them between layers of thermoplastic. Ceramics and plates can be added to provide even higher levels of protection. The bullet proof vest 300 shown in FIG. 7 is preferably held together by a fabric insert casing 312.

To add additional hazard protection to the bullet proof vest 300 shown in FIG. 7, an additional layer 320 can be inserted. This additional layer 320 can, in one embodiment, be a radiation protecting layer. By adding such a radiation protecting layer to the bullet proof vest, the bullet proof vest would achieve protection against radiation as well as bullets and shrapnel. Similarly, one could impart fire, chemical and/or biological protection by using a multiple layer material of the type described in connection with FIG. 6. In the case of radiation protection alone, one would usually want the added layer 320 to be situated close to the user's body in order to take advantage of the superior heat dissipation properties of the radiation protective layer. By contrast, in the case of a fabric imparting fire, chemical and/or biological protection, one would typically want that layer near the outside of the bullet proof vest in order to prevent those contaminants from permeating into the bullet proof vest 300.

Figure 8:
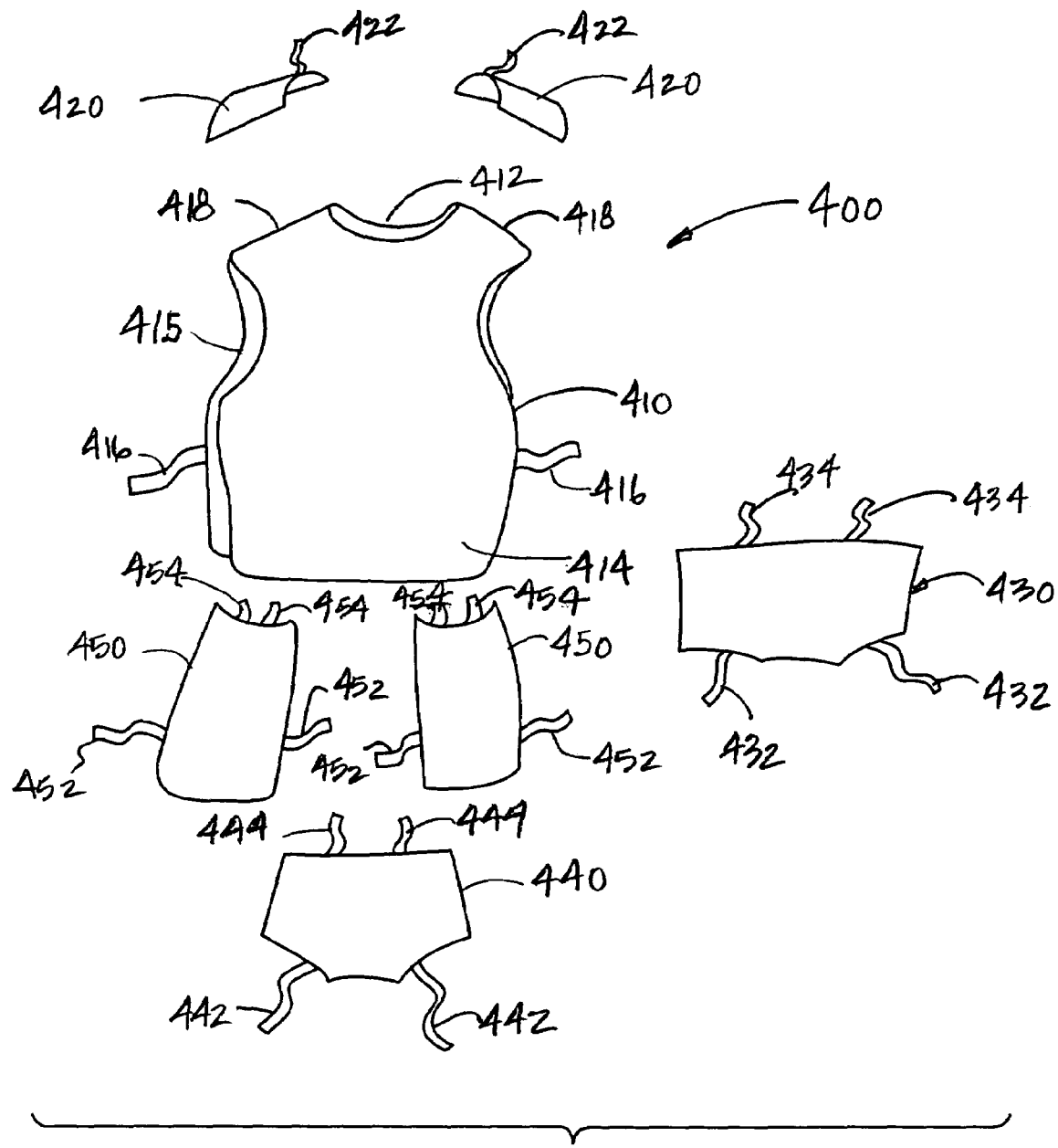
FIG. 8 illustrates an exploded view of protective clothing which can be worn as undergarments.

Turning now to FIG. 8, a multipiece protective garment 400 is illustrated which can be used as an undergarment. In certain applications, it is best to disguise the fact that one may be wearing a protective garment. For example, a policeman or other first responder may want to be protected against radiation and other hazards while not alarming others that such hazards may be present. Similarly, the attendant who operates an x-ray inspection machine at an airport would want to be protected against continuous exposure to radiation throughout the work day while not causing airline passengers to panic about their own incidental contact with the same x-ray inspection machine.

In the FIG. 8 embodiment, this multipiece protective garment includes a vest 410, two shoulder flaps 420, a rear groin flap 430, a front groin flap 440 and two thigh flaps 450. Through a head hole 412, the vest 410 would fit over the user's head so that the front vest panel 414 would cover the user's chest and the rear vest panel 415 would cover the user's back. To achieve a snug fit, the front vest panel 414 is attached to the rear vest panel 415 using straps 416. The straps 416 can be fastened in a number of well known ways, including snap buttons, VELCRO™ fasteners, tie straps, buckles are the like. Rear groin flap 430 and front groin flap 440 are used to protect the waist and groin area of the user. The rear groin flap 430 would be fitted over the user's buttocks while the front groin flap 440 would be fitted over the user's groin. Upper straps 434, 444 are provided so that the rear groin flap 430 and front groin flap 440 can be attached to the bottom of the vest 410 so that they can hang from the vest. For a snug fit, lower straps 432, 442 are provided on both groin flaps 430, 440 which can be pulled under the groin to connect with the lower straps 432, 442 from the mating groin flap 430, 440. To protect the user's thighs, two thigh flaps 450 are provided. These thigh flaps 450 are curved so that they can wrap around the user's left and right thighs. Four straps 452, 454 are provided for each of these thigh flaps. The lower thigh flap straps 452 would wrap around the user's upper leg and fasten onto the mating lower thigh flap strap 452. By contrast, the upper thigh flap straps 454 could either be fastened to the lower portion of the front groin flap 440 or, like the lower thigh flap straps 452, could wrap around the user's upper leg and fasten onto the mating upper thigh flap strap 454. The user's shoulders are protected by shoulder flaps 420. These shoulder flaps 420 are used to cover the user's left and right shoulders while being attached to the upper portions 418 of the vest 410. By leaving the sides of the vest 410 open and using shoulder flap 420 attachments, the multipiece protective garment 400 of the present invention allows for free arm movement while providing protection for vital organs. Similarly, by separating the vest 410 from the groin flaps 430, 440 and thigh flaps 450, the user is allowed to freely move his legs and torso while again obtaining protection for vital organs.

The multipiece protective garment 400 is constructed from the same type of radiation and hazard protecting materials previously described. For radiation protection alone, a radiation protective polymeric film can be applied to fabric in the manner described in co-pending application Ser. No. 10/620,954 and then cut into the shapes illustrated in FIG. 8. Alternatively, a multilayer material of the type shown in FIG. 6 or a multilayer composite of the type shown in FIG. 7 could be cut into the shapes illustrated in FIG. 8 to provide protection against multiple hazards including radiation, chemical, biological, fire and projectile hazards. In addition to undergarments, these same principles could be applied to producing a hazard protection blanket, "dirty" or nuclear bomb suppression blanket, jacket, pants, shirt, drape, x-ray apron, vest, cap, glove and similar protective articles. These same principles could also be applied to the manufacture of liners or coatings for vehicles, walls, vessels, airplanes, spacecraft, house foundations and containers to shield against a wide spectrum of electromagnetic and ionizing radiation.

Figure 9:
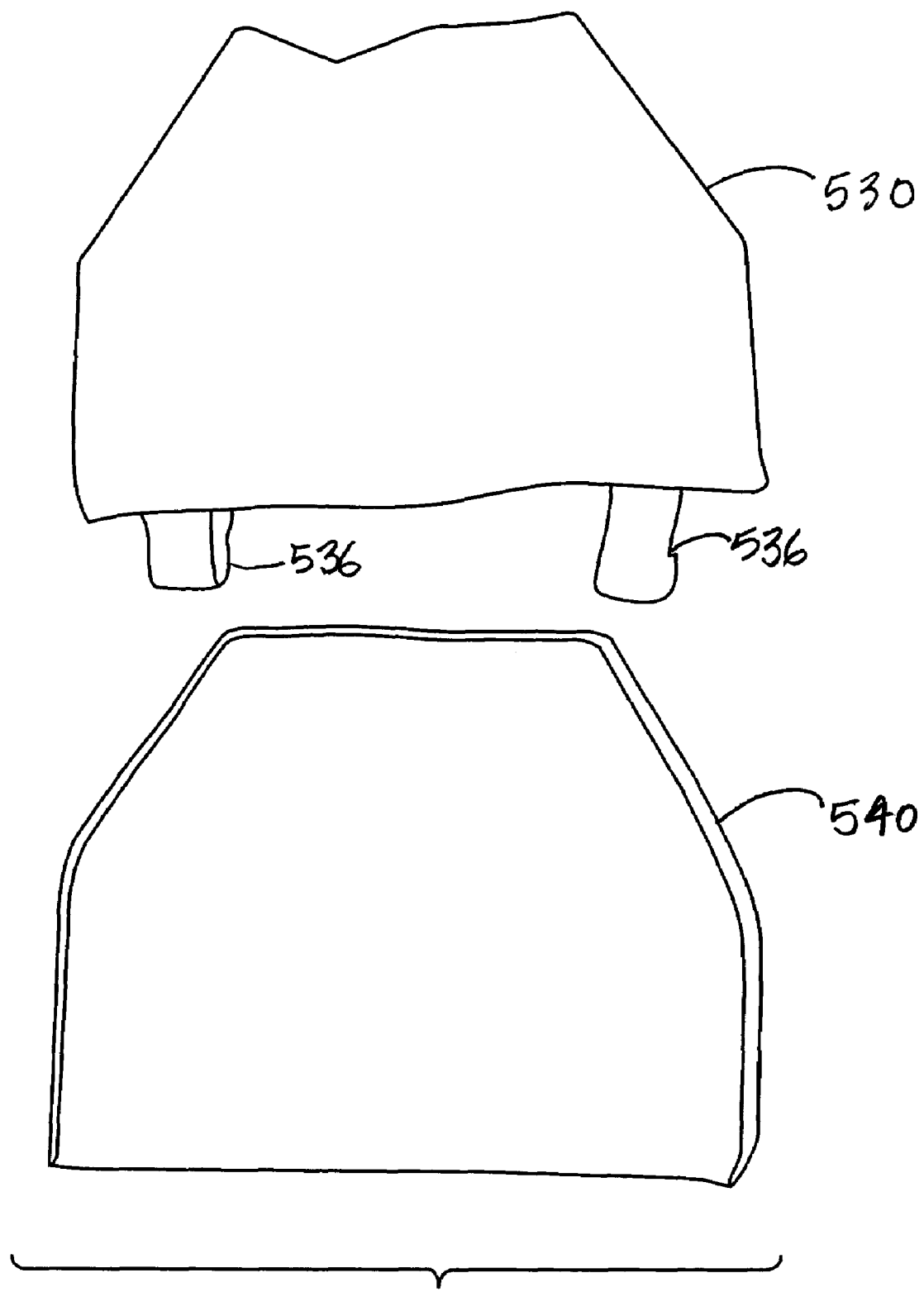
FIG. 9 illustrates a pocket and a hazard protecting insert for that pocket.

FIG. 9 shows an alternate embodiment to constructing components of the multipiece protective garment 400. In this embodiment, the rear groin flap 530 is constructed from standard fabric in the form of a pocket. The protective layer or layers are then made in the form of an insert 540 which can fit into the top of the pocket. Straps 536 are sewn into the bottom of the fabric pocket 530 in order to prevent the insert 540 from falling out of the pocket after insertion. This pocket 530 and insert 540 approach allows different types of inserts to be used depending upon the expected hazard. For example, if the user is likely to encounter only a radiation hazard, an insert can be used which protects only against radiation hazards. On the other hand, if projectile, chemical or biological hazards are also possible, a more bulky insert can be used which would provide protection against these additional hazards. This type of pocket 530 and insert 540 may also be used to form a pocket on the back of vest 410 (see, FIG. 8), for example, to provide additional protection for the spine or as a belt loop to accept a belt or lumbar support brace.

Additionally, recent advances in nanotechnology can be used to create better radiation detectable and protective articles In certain embodiments, these radiation attenuating articles can also provide protection against other types of hazards, such as fire, chemical, biological and projectile hazards as well as against a wide range of electromagnetic radiation energies.

Nano-materials are materials that have structural features (particle size or grain size, for example) in the range of 1-100 nanometers in at least one dimension. Owing to their small size and high specific surface area to volume ratio, these materials demonstrate unique mechanical, electrical, electronic and optical properties. In addition, nano-materials, unlike conventional micron-sized materials, are less likely to create large stress concentrations, which in turn increases their yield strength, tensile strength and Young's modulus.

In the present invention, nano-materials are used in at least three different ways. In one embodiment, nano-materials are added to the previously disclosed radiation protective polymeric mixtures to either enhance the radiation protection or provide additional protections, such as fire, chemical, biological and/or projectile protection. In a second embodiment, nanoparticles formed from radiopaque materials (e.g., barium, bismuth, tungsten etc.) or other hazard protecting materials are used in the polymeric mixture instead of more bulky forms of the same or similar protective materials. Use of radiopaque nano-materials allows more even dispersion of radiopaque materials in the polymeric mixture with the attendant possibility of allowing higher concentrations of radiopaque materials before the polymer becomes embrittled. In a third embodiment, the nano-materials are formed into a discrete nano-material layer. Such a discrete nano-material layer could either be added to a product or formed into a stand alone product.

Nano-materials used in the present invention include nanoparticles, nanotubes and nano platelets.

The first type of nanomaterials used in the present invention are nanoparticles. Suitable nanoparticles include nanopowders of conventional radiopaque materials, nano ceramics, nano shells, nanospheres and other nanoparticles in the shape of hemispheres and parabolas. Relative proportions of radiopaque materials could be increased in a polymeric mixture by replacing bulky radiopaque materials with radiopaque nanopowders or by incorporating a mixture of both nano-sized and micron-sized radiopaque powders. By incorporating a greater proportion of radiopaque nanopowders into the polymeric mixture, the resultant product could have enhanced electromagnetic radiation attenuating capabilities.

Nanopowders of radiopaque materials are commercially available and could be incorporated into a polymer using standard compounding techniques. The types of radiopaque nano-powders that could be used include: tungsten, barium, boron, lead, tin, bismuth, depleted uranium, cerium, yttrium, tantalum, lanthanum, neodymium and their compounds. Tungsten (APS: 100 nm) and tantalum (APS: 100 nm) nanopowders can be purchased, for example, from Argonide Nanomaterial Technologies, Sanford, Florida. Rare earth radiopaque nanomaterials of cerium oxide, yttrium oxide or neodymium oxide can be purchased at NanoProducts Corporation, Longmont, CO.

Moreover, nanoparticles formed in the shape of hollow nanospheres, nano-hemi spheres, nano parabolas and nano shells could be used in the present invention to achieve radio pacification and attenuation of a wide spectrum of electromagnetic radiation. These shaped nanoparticles are believed to deflect, reflect and capture radiation in a manner similar to the way mirrors deflect, reflect and capture lightwaves. Since these shaped nanoparticles are believed to attenuate radiation differently than powdered radiopaque nanoparticles, these shaped nanoparticles do not need to be formed from radiopaque materials, but may instead be formed from such materials as metal/semiconductor hybrid particles. For example, hybrid CdS coated gold nanoparticles have been found to exhibit red-shifted plasmon resonance absorption. This resonance absorption band of the metal nanoparticles is a function of the particle size. As the particle size decreases, the theoretical wavelength of maximum absorption intensity could be approached. By creating these metal nano spheres, hemi spheres and parabola structures in specific shapes and curvatures, the optical-like properties can be used to attenuate against smaller wavelengths of the electromagnetic spectrum including radio waves, ultraviolet rays, and ionizing radiation, such as x-rays and gamma rays. Unlike conventional heavy metals, which absorb or scatter the electromagnetic radiation, these nanoparticles effectively redirect, shift or reflect the electromagnetic radiation, later converting it into a lesser energy or heat.

Figure 5A:
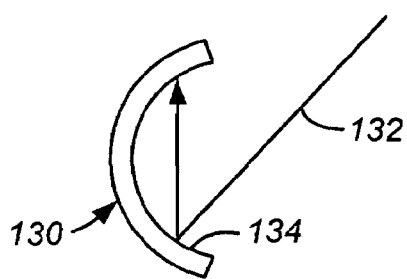
FIG. 5A shows a side view of a nano-hemisphere for attenuating radiation.
Figure 5B:
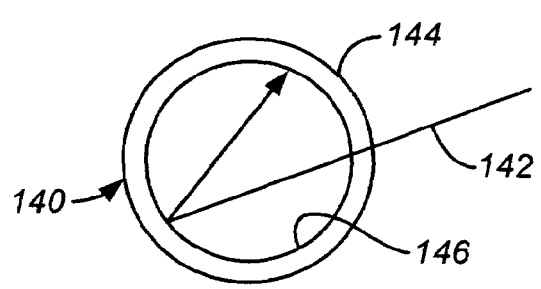
FIG. 5B shows a side view of a nanosphere for attenuating radiation.

Referring to FIG. 5A, the deflection of radiation 132 by the concave inner surface 134 of a nano-hemisphere is illustrated. In FIG. 5B, radiation 142 passes through the concave outer surface 144 of a nanosphere 140, but is internally reflected and, thereby, captured by the concave inner surface 146 of the same nanosphere 140.

As is known in the art, resonating antennas in a parabolic or semi-spherical shape have very sharp directional characteristics. By analogy, when creating similar resonating characteristics for radiation at a nano level, one would preferably want to orient the position of the nano-materials in space to create a layer which would block radiation coming from a particular direction (e.g., the outside of a garment). Nonetheless, by applying a coating of randomly positioned particles in hundreds of layers, one can effectively achieve shielding from all directions. For better performance, such a coating of nano-materials should have a minimum of voids. As such, when making a mixture of nano-materials with a binder, the nano-materials should preferably be the bulk of the coating, for example, over 70% and, more preferably, between 85% and 95% by weight.

Ceramic nanoparticles could also be added to the radiopaque polymeric mixture to enhance not only mechanical strength, like tensile strength and creep resistance, but also enhance heat resistance, anti-ballistic, electromagnetic attenuation and neutron emission attenuation. Ceramic nanopowders, which include, but are not limited to, oxides of aluminum, zirconium, silicon, titanium, mullite and spinel as well as carbides/nitrides such as boron carbide, silicon carbide, titanium carbide, tungsten carbide, boron nitride, silicon nitride, titanium diboride, zirconium diboride and other intermetallics like nickel aluminide, titanium aluminide and molybdenum disilicate could be advantageously incorporated into the polymeric mixture to provide radiation attenuation. These ceramic nanomaterials can be prepared by a number of methods including chemical vapor deposition, pulsed laser deposition, conventional powder processing (i.e. sol-gel processing), plasma synthesis, pyrolysis, carbothermal reduction, hydrothermal processes, emulsion processes, combustion synthesis, NIST process, precipitation, electrical arc, and ball milling. Adding metallic second phase particles into ceramics can also be done to enhance mechanical, thermal and electromagnetic attenuation properties. Metals such as tungsten, molybdenum, nickel, copper, cobalt and iron can be added to the ceramics using conventional powder metallurgical techniques and solution chemical processes like sol-gel, as well as co-precipitation methods.

Alternatively, nanoparticles could be synthesized by several additional techniques. One such technique is colloidal templating in which an inner removable template particle, such as silica or polymer beads, are coated with metal materials in a multi-step colloidal or vapor-phase assembly and can later be removed to create empty metallic shells. Creating uniform coating on a particle template by colloidal self-assembly is based on the concept of self-assembled organic molecular species. The two ends of the molecules to be joined have specific functional groups (i.e. Thiols, amines, carboxylic groups) that can be targeted for specific interactions with the template and the clusters that are used to make the coatings. Uniform dense packing of the molecules around the templates leads to close packing of the clusters that form a porous but space filled shell around the template. Non-interacting metal-coated magnetic particles, which include $SiO_2$/Au, $Fe_3O_4$/Au, NiO/Co, silver, platinum, tantalum, tungsten, aluminum and copper or coated semi-conducting particles, such as PbS/CdS, are examples of such composite particle structures. Alternatively PbS-coated CdS nanocomposite particles that are a few nanometers in diameter can be synthesized by ion displacement in inverse micro emulsions. The refractive nonlinearity in these nano-composite particles may be attributed to the optical Stark effect and to strong interfacial and inter nano-particle interactions.

Hollow nanospheres could be synthesized by taking advantage of the nanoscale Kirkendall effect. When nano-crystals, such as cobalt, are exposed to sulfur, there is a differential in diffusion in which the cobalt atoms move outward more quickly that then sulfur atoms thus creating a hollow nanosphere of cobalt sulfide. Cobalt oxide and cobalt selenide could also be synthesized by this technique. Similarly, it may be possible to synthesize other metals such as silver, gold, platinum, aluminum, copper and tungsten using this technique.

Nanoparticles could also be made via in-situ particle formation/in-situ polymerization. In this method, a stable suspension of metal particles is prepared in the presence of a polymer. Once in solution, the composite can be cast, or additional monomers of the same or different polymer type can be added to form a nano-composite. The reaction occurs in the presence of a protective polymer, which limits the size of the resultant nano-composite. Particle size is also controlled by the choice of metal precursor and the metal/polymer interaction. For example, if $PdCl_2$ is compared with $(NH_4)_2PdCl_4$, the former tends to form halogen-bridged complexes and thus tends to form agglomerates of nano-particles, but the latter does not. The interaction of the metal precursor with the polymer is also important in controlling particle size. If the polymer has a stronger interaction with the precursor, then the particle size tends to be reduced because the metal precursors are prevented from phase separating. Using this technique, nanoparticles could also be formed through the use of micelles formed from amphiphilic block polymers or cross-linked gelled matrices. Using copolymers to form micelles, metal salts are introduced that can either penetrate the micelle or are stable in the micelle corona. A reducing agent can be added and metal particles form either within the micelles or in the corona resulting in several morphologies.

In general, nanoparticle size is controlled in several ways depending on the synthesizing technique used. For instance, in gas phase, synthesis particle size is controlled by varying the system parameters such as temperature, gas flow rate and system pressure. In other methods such as sol-gel technique, the particle size can be varied by changing the concentration of the solutions and temperature. In mechanical milling, the particle size depends more on the speed of the grinding media and milling time.

Hollow nano-crystals can be commercially obtained from the Molecular Foundry at the Berkeley National Laboratory in Berkeley California, which specializes in synthesizing hollow metal, metal oxide/sulphide nano-crystals.

The second type of nano-materials used in the present invention are nano-tubes. Nano-tubes are typically formed from carbon. When added to a polymeric mixture, nano-tubes represent another way to enhance mechanical properties like modulus, chemical resistance, flame resistance, strength and also electrical conductivity of the mixture. Carbon nano-tubes have unique electrical properties because the electronic conduction process in nano-tubes is confined in the radial direction and, as a result, they can also be used to attenuate electromagnetic radiation. The methods to produce these nanotubes includes chemical vapor deposition techniques using catalysts and hydrocarbon precursors to grow the nano-tubes. Nano-tubes can also be made by electric arc, laser ablation, chemical vapor deposition and high pressure carbon monoxide conversion (HiPCO). HiPCO uses high-pressure disproportionation of carbon monoxide gas in the presence of iron carbonyl catalyst vapor to produce nano-tubes of 80% purity in large quantities. Other types of nano-tubes include the hexagonal boron nitride nano-tubes, nano-tubes made of dichalcogenides (i.e. $MoS_2$, $WS_2$), nano-tubes of oxides (i.e. $V_2O$, $MoO_3$), gold nanotubes and organic nano-tubes. Nano-tubes may be commercially purchased from Materials and Electrochemical Research Corporation of Tucson, Ariz.

Once produced, nano-tubes should undergo purification procedures before they can be incorporated into a radiopaque polymeric mixture of the present invention. Methods of purification and processing include preliminary filtration, dissolution, micro-filtration, settling and chromatography. The resultant nano-tube product is then preferably dispersed in the polymeric mixture with a surfactant, such as sodium dodecyl sulfate.

The third type of nano-materials that could be added to the radio opaque polymeric mixture are nano platelets (i.e., plate-like nano-fillers). Nano platelets are layered materials that typically have a high aspect ratio and a thickness on the order of about 1 nm.

When added to a polymeric mixture in quantity, nano-platelets would enhance the mixture's chemical, ballistic, fire, electromagnetic radiation and neutron resistance. Nano-platelets include nano-clays, such as montmorillonites clays. Montmorillonite clays belong to the smectite group which also includes clays like bentonite, hectorite, pyrophyllite, talc, vermiculite, sauconite, saponite and nontronite, layered silicic acids (i.e. kanemite and makatite) and layered double hydroxides. Clays from other groups, such as kaolinites and chlorites, and other phyllosilicates, such as mica, could also be used. Transition-metal dichalcogenides (i.e. tantalum dichalcogenides intercalated with lithium) could also be dispersed in a polymer mixture not only to provide the mixture with nanoclay like properties (because of its similar layered structure), but also to enhance the electromagnetic radiation attenuation.

Natural nano-clays, such as smectites clays, are highly layered weakly bonded materials. Each layer consists of two sheets of silica tetrahedra with an edge shared octahedral sheet of either alumina or magnesia. Due to the isomorphic substitution of alumina into the silicate layers or magnesium for aluminum, each unit cell has a negative charge. The natural nano-clay layers are held together with a layer of charge compensating cations such as Lithium (Li+), Sodium (Na+), Potassium (K+), and Calcium (Ca+). These charge-compensating cations provide a route to the rich intercalation chemistry and surface modification that is required to disperse nanoclays into the polymer. Synthetic clays, such as hydrotalcite, carry a positive charge on the platelets. For these layered nano-clays to become useful within the radiopaque polymeric mixture, the layers should be separated and dispersed properly within the mixture. In the case of nano-clays, such as silicate clays, they are inherently hydrophilic while the polymers tend to be hydrophobic. To get intercalation and exfoliation of these clays, the galleries or layers of these clays must be opened and the polarities of the resultant clay must match the polarity of the polymer so that the polymer will intercalate between the layers. This is done by exchanging an organic cation for an inorganic cation. The larger organic cation will swell the layers and increase the hydrophobic properties of the clay. The organically modified clay can then be intercalated with the polymer by several routes. For positively charged clays, such as hydrotalcite, an anionic surfactant can be used. Other types of clay modifications can be used depending on the choice of polymer. These include ion-dipole interactions, the use of silane coupling agents and the use of block polymers. An example of ion-dipole interactions is the intercalation of a small molecule, such as dodecylpyrrolidone, into the clay. Unfavorable interactions of clay edges with polymers can be overcome by the use of silane coupling agents to modify the edges. Alternatively, compatibilization of clays and polymers can be done through the use of copolymers where one component of the copolymer is compatible with the clay and the other component of the copolymer is compatible with the polymer.

The resistance of a polymeric mixture to harmful chemicals could be improved substantially by incorporating a small amount of nanoclays (about 2 to 5% by weight) into the polymer mixture. The level of chemical resistance improvement depends on many factors, though, such as the degree of exfoliation of the nano platelets in the polymer mixture, the percentage of the nano-material filler, its aspect ratio, and the alignment of the platelets. By incorporating nano-clays within the polymeric mixture, oxygen transmission through the mixture is particularly reduced which then reduces polymer degradation by reducing oxidation of the resins and hence improving its flame retardancy property as well. In addition, the inorganic phase can act as a sink to prevent polymer chains from decomposing.

To enhance flame retardance in polymeric mixtures of the present invention, traditional fire retardant additives, such as alumina trihydrate (ATH), magnesium hydroxide or organic brominated and chlorinated compounds are often added. Nonetheless, very high levels of these fire retardant additives are usually needed to achieve acceptable levels of fire retardancy (e.g., for cable or wires). These high additive levels make the manufacturing process more difficult and therefore embrittles the polymeric end product.

In the present invention, nanomaterials can be used in the polymeric mixture to overcome this fire retardant embrittlement problem. More specifically, a small weight percent of nanoclays (e.g., 2 to 10%) can be added with the traditional bulky fire-retardant additives, such as ATH or magnesium hydroxide, to drastically lower the additive loading levels needed to achieve the same or an improved level of flame resistance in a polymeric mixture. Other nano sized fire-retardant additives which could be added to the polymeric mixture are nano/micron-sized oxides such as antimony oxide, nano/micron-sized compounds of molybdenum, titanium, zirconium and zinc. Silicon carbide, silicon nitrate, aluminum nitride, silicon nano-tubes, carbon nano-tubes, boron nitride nano-tubes also could be used to enhance the fire resistant properties of a polymer. Moreover, conventional fire resistant additives, such as ATH or magnesium hydroxide, could be added in the nano-size range to more effectively achieve fire resistance in a polymeric mixture. Through use of these nanomaterials, the resultant polymeric mixture would be more strong, light and flexible.

One of the key limitations in the use of nano-materials in polymeric compositions is processing. More specifically, nanomaterials tend to agglomerate to reduce their surface area and, therefore, without proper dispersion and distribution in the polymer mixture, the desired properties of the resulting nano-composite cannot be achieved. In order to effectively disperse nanomaterials into a polymer and process the resulting mixture by standard manufacturing techniques, the nanomaterials should be surface modified. For instance, in the case of nanoclays, the clay surface can be modified by a process known as compatibilization so that the nanoclays are attracted to the polymeric resin matrices and thus get thoroughly dispersed. The two most common compatibilization methods are onium ion modification and the ion-dipole interaction.

Once the nano-material agglomeration problem is overcome, there are three general ways of dispersing nano-materials into the polymeric mixture. The first is direct mixing of the polymer and the nano-materials either as a discrete phase or in solution. The second is in-situ polymerization in the presence of a nano-material, and the third is in-situ particle processing which involves both in-situ formation of the nano-materials and in-situ polymerization.

For example, to prepare a chemical-fire resistant nano-composite, a polymer, such as ethyl vinyl acetate (EVA), can be directly mixed with nano-platelets such as nano-clays, silicic acids, or transitional metal dichalcogenides. Such a mixture can be made with or without conventional fire retardants, such as ATH and magnesium hydroxide. The resultant polymeric mixture can then be processed in a twin-screw extruder and formed into a desired product using blow molding, or injection molding. Compounding with twin-screw extruder creates a great amount of shear force, which helps exfoliate the nano-materials in the polymer mixture. The addition of nanoclays or nanotubes would increase the viscosity of the polymeric mixture. Therefore, the rheology of the mixture should be closely monitored and controlled, though, by adding Theological additives that are compatible to the polymer and filler used (i.e. nanoclays or nanotubes).

To produce the protective products of the present invention, nano-materials can also be coated on several different substrates, including polymeric substrates. Using known techniques, such as evaporation, sputtering (glow discharge/ion and beam/laser), ion plating, chemical vapor deposition (CVD), plasma enhanced CVD, thermal spraying, dip coating, fluidized bed, and atomized liquid spray, nano-composites can be coated on several different substrates. Also, nano-materials could be applied as a coat on different substrates by other techniques like unassisted spraying, spraying assisted by a high voltage electrical field, liquid coating by such existing technologies as roll stock, extrusion, coating and co-extrusion.

Alternatively, nano-materials can be applied to a flexible film, which can then be coated with a pressure sensitive adhesive to produce a self-adhering material with shielding properties. For protection of human skin from the sun's ultraviolet rays, for example, nano-materials can be mixed with binders to form a spray or ointment to be applied directly to the skin. Further, since the thickness of several hundred rows of nano-materials is on the order of a single micrometer, the nano shielding materials of the present invention can be made transparent to visible light and thereby allow its use in the manufacture of goggles and other clear shields, with excellent optical properties.

Figure 10:
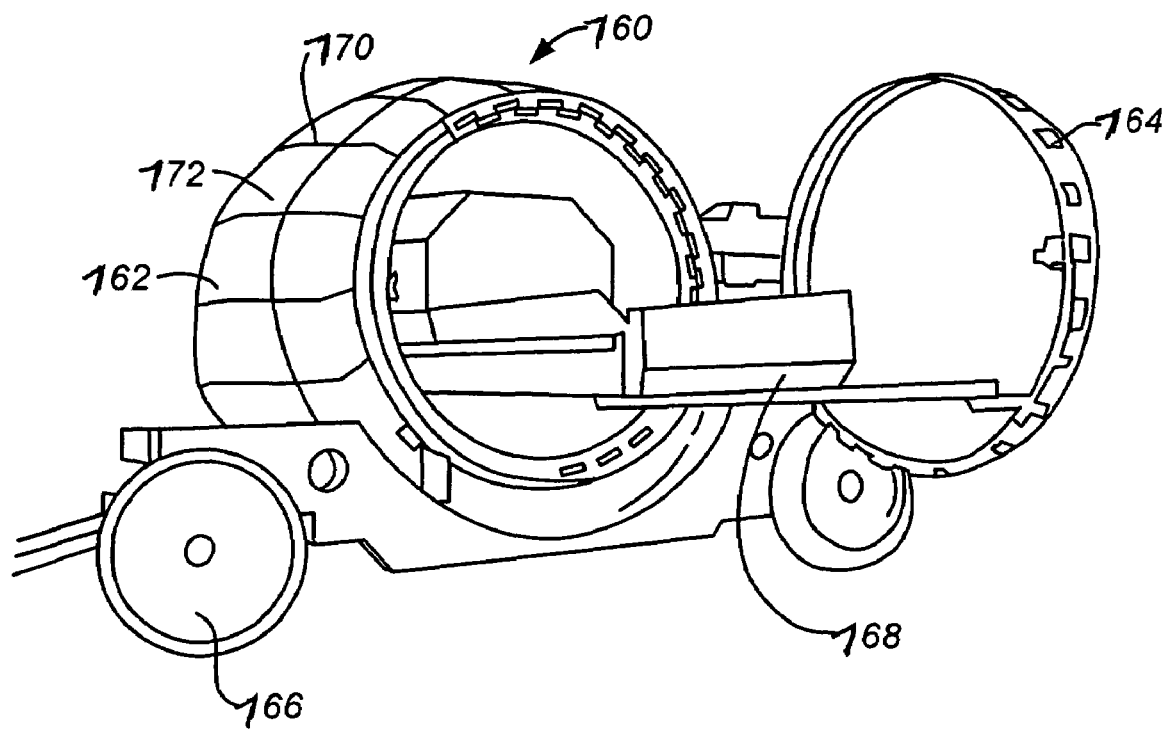
FIG. 10 shows a perspective view of a radiation attenuating bomb containment vessel.

Turning now to FIG. 10, a bomb containment vessel 760 is shown which includes bomb containment sphere 762, front hatch 764, wheel assembly 766 and bomb tray 768. The sphere 762 and front hatch 764 of the bomb containment vessel 760 are constructed out of a hard explosion resistant material, such as hardened steel. While existing bomb containment vessels 760 are constructed to contain conventional bomb explosions, they are not designed to also trap or attenuate nuclear radiation, such as gamma and neutron emissions or rays. Using the principles of the present invention, though, the bomb containment vessel 760 can be reconfigured to also protect against the nuclear hazards produced by, for example, a "dirty" or radiological bomb.

In the preferred embodiment, a radiation protective polymeric layer 770 is applied to the outside of the bomb containment vessel 760. As before, the radiation protective polymeric layer 770 is formed from a mixture, which includes one or more of the previously mentioned radiopaque materials and one or more of the previously mentioned polymers. In the preferred embodiment illustrated in FIG. 10, the radiopaque polymeric mixture is used to form curved radiopaque tiles 772. These radiopaque tiles 772 can be formed by any number of known manufacturing processes, including injection molding, extrusion, vacuum forming, drape forming, pressure forming and plug assisted forming. The radiopaque tiles 772 are then adhered to the outside surface of the bomb containment vessel 760 and to each other. To enhance the appearance of the bomb containment vessel 760, a smooth decorative layer (not shown) can then be applied over the radiopaque tiles 772. Alternatively, a radiopaque polymeric layer can be formed in one piece, or can be evenly coated on the outside or within the bomb containment vessel through adhesive spraying, rotational molding, injection molding, dipping in a liquid bath, painting or other known coating and injection molding processes.

In operation, the hardened materials of the bomb containment vessel 760 will contain the explosive force of the bomb while the radiation protective layer 770 of the present invention will contain any radiation emitted by the bomb. While the radiation protective layer of the present invention could also be applied to the inside of the bomb containment vessel 760, the inventors believe that this would be less effective because of the damage an explosion could do to the radiation protective layer 770.

In the foregoing specification, the invention has been described with reference to specific preferred embodiments and methods. It will, however, be evident to those of skill in the art that various modifications and changes may be made without departing from the broader spirit and scope of the invention as set forth in the appended claims. For example, those of skill in the art will recognize that the principles of the present invention would apply to many types of articles besides the toys, utensils, weapons and medical devices previously described. More specifically, the relatively lightweight radiopaque materials of the present invention could be incorporated into virtually any type of plastic product (e.g., auto parts, phones, storage containers etc.) to allow the presence and/or attributes of such products to be assessed using x-rays. Further, the principles of the present invention would apply to virtually all types of manufacturing processes for plastic products. While x-ray inspection has been described in the preferred embodiments, other types of radiation, such as alpha, beta or gamma radiation could alternatively be used to detect the radiopaque polymeric articles. In the case of nano-materials, since many nano-materials have been found to have minimal toxicity, nano-composites could be added intravenously or orally to the human body to provide enhanced tissue contrast for use in radiography. The specification and drawings are, accordingly, to be regarded in an illustrative, rather than restrictive sense; the invention being limited only by the appended claims.

What is claimed is:

1. An article of clothing comprising a flexible layer formed from a radiopaque polymeric mixture having a polymer and a radiopaque nano-material.

2. The article of clothing of claim 1 wherein said nano-material is selected from the group consisting of nanoparticles, nanotubes and nano-platelets.

3. The article of clothing of claim 1 wherein the nano-material is formed from one or more nano-sized substances selected from the group of tungsten, barium, boron, tantalum, bismuth, silver, gold, platinum, aluminum, copper, depleted uranium, cerium oxide ($CeO_2$), yttrium oxide ($Y_2O_3$), lanthanum oxide ($La_2O_3$) and neodymium oxide ($Nd_2O_3$).

4. The article of clothing of claim 1 wherein the nano-material is formed from one or more radiopaque substances including nano-sized lead or tin.

5. The article of clothing of claim 1 wherein the nano-material includes transitional-metal dichalcogenides.

6. The article of clothing of claim 1 wherein said nano-material is selected from the group consisting of nano-spheres, nano-hemispheres and nano-parabolas.

7. The article of clothing of claim 1 wherein the polymer is selected from the group consisting of polyurethane, polyamide, polyvinyl chloride, polyvinyl alcohol, natural latex, polyethylene, polypropylene, ethylene vinyl acetate, polyester, acrylonitrile-butadiene-styrene, acrylic, polyisoprene, polystyrene, polysulfone polycarbonate, polyoxymethylene, acetal, polytetrafluoroethylene, ionomers, celluloses, polyetherketone, silicones, epoxy, elastomers and polymer foams.

8. The article of clothing of claim 1 wherein said polymeric mixture further comprises a fire retardant nano-material.

9. The article of clothing of claim 8 wherein said fire retardant nano-material is selected from the group consisting of nano-clays, nano sized antimony oxide, nano-sized antimony pentoxite, and nano-sized compounds of molybdenum, titanium, zirconium, zinc, silicon carbide, silicon nitrate, aluminum nitride, alumina trihydrate, magnesium hydroxide, organic brominated compounds, organic chlorinated compounds, natural and synthetic nano-clays, pyrophyllite, chlorites, smectites, montrmorillonites, palygorskites, talc, vermiculite, sauconite, saponite, nontronite and mica.

10. The article of clothing of claim 1 further comprising an additive within said polymeric mixture to impart enhanced chemical, biological or projectile protection.

11. The article of clothing of claim 10 wherein said chemical, biological or projectile protective additive is selected from the group consisting of alumina oxides, aironia oxides, ferrite oxides, tianate oxides, mixed complex oxides, carbide powders, nitride powders and boride powders.

12. The article of clothing of claim 1 wherein said nano-material is selected from the group consisting of natural nano-clays, synthetic nano-clays, layered silicic acids and nano-tubes.

13. The article of clothing of claim 1 wherein said nano-material is widely distributed throughout said polymer mixture.

14. The article of clothing of claim 1 wherein said article of clothing is an undergarment, vest, cap, glove, full body suit, apron, shirt, pants, pocket or groin protector.

15. A radiation protective article of clothing comprising a flexible layer formed from a polymeric mixture and a radiation protective nano-material.

16. The radiation protective article of clothing of claim 15 wherein said radiation protective nano-material is selected from the group of nano-sized lead, tin, tungsten, barium, boron, tantalum, bismuth, silver, gold, platinum, aluminum, copper, depleted uranium, barium, cerium oxide ($CeO_2$), yttrium oxide ($Y_2O_3$), lanthanum oxide ($La_2O_3$) and neodymium oxide ($Nd_2O_3$).

17. The radiation protective article of clothing of claim 15 wherein said polymer is selected from the group consisting of polyurethane, polyamide, polyvinyl chloride, polyvinyl alcohol, natural latex, polyethylene, polypropylene, ethylene vinyl acetate, polyisoprene, polystyrene, polysulfone, polyester, acrylonitrile-butadiene-styrene, acrylic, polycarbonate, polyoxymethylene, acetal, polytetrafluoroethylene, ionomers, celluloses, polyetherketone, silicones, epoxy, elastomers and polymer foams.

18. The radiation protective article of clothing of claim 15 wherein said radiation protective nano-material is selected from the group of nano-clays, nano-spheres, nano-hemispheres and nano-parabolas.

19. The radiation protective article of clothing of claim 15 further comprising an additional radiation protective material of regular size selected from the group consisting of lead, tin, barium, barium sulfate, barium chloride, other barium compounds, tungsten, tungsten carbide, tungsten oxide, other tungsten compounds, bismuth, bismuth compounds, tantalum, tantalum compounds, titanium, titanium compounds, Diatrizoate Meglumine Inj. USP, Acetrizoate Sodium, boron, boric acid, boron oxide, boron salts, other boron compounds, beryllium, beryllium compounds, Bunamiodyl Sodium, Diatrizoate Sodium, Ethiodized Oil, Iobenzamic Acid, Iocarmic Acid, Iocetamic Acid, Iodipamide, Iodixanol, Iodized Oil, Iodoalphionic Acid, o-Iodohippurate Sodium, Iodophthalein Sodium, Iodopyracet, Ioglycamic Acid, Iohexol, Iomeglamic Acid, Iopamidol, Iopanoic Acid, Iopentol, Iophendylate, Iophenoxic Acid, Iopromide, Iopronic Acid, Copyhold, Iopydone, Iothalamic Acid, Iotrolan, Ioversol, Ioxaglic Acid, Ioxilan, Ipodate, Meglumine Acetrizoate, Meglumine Ditrizoate Methiodal Sodium, Metrizamide, Metrizoic Acid, Phenobutiodil, Phentetiothalein Sodium, Propryliodone, Sodium Iodomethamate, Sozoiodolic Acid, Thorium Oxide and Trypanoate Sodium.

20. The radiation protective article of clothing of claim 15 wherein said article of clothing is an undergarment, vest, cap, glove, full body suit, apron, shirt, pants, pocket or groin protector.

\* \* \* \* \*